(12) United States Patent
Emmadi et al.

(10) Patent No.: US 9,813,323 B2
(45) Date of Patent: Nov. 7, 2017

(54) SYSTEMS AND METHODS FOR CONTROLLING SWITCHES TO CAPTURE AND MONITOR NETWORK TRAFFIC

(71) Applicant: Big Switch Networks, Inc., Santa Clara, CA (US)

(72) Inventors: Vishnu Emmadi, Sunnyvale, CA (US); Srinivasan Ramasubramanian, Sunnyvale, CA (US); Shrinivasa Kini, Santa Clara, CA (US); Mei Yang, Fremont, CA (US); Sudeep Dilip Modi, Milpitas, CA (US); Gregor Mathias Maier, Alameda, CA (US); Rajneesh Bajpai, San Jose, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 148 days.

(21) Appl. No.: 14/618,635

(22) Filed: Feb. 10, 2015

(65) Prior Publication Data
US 2016/0234091 A1 Aug. 11, 2016

(51) Int. Cl.
*H04L 12/26* (2006.01)
*H04L 12/24* (2006.01)
(Continued)

(52) U.S. Cl.
CPC .......... *H04L 43/12* (2013.01); *H04L 41/0806* (2013.01); *H04L 41/0893* (2013.01);
(Continued)

(58) Field of Classification Search
CPC ... H04L 43/12; H04L 43/062; H04L 41/0893; H04L 41/0806; H04L 45/38; H04L 45/245
See application file for complete search history.

(56) References Cited

U.S. PATENT DOCUMENTS 7,529,180 B1  5/2009  Karl et al.
7,577,098 B2  8/2009  Tamura et al.
(Continued)

FOREIGN PATENT DOCUMENTS

EP  1289191       3/2003
EP  1289191 A1 *  3/2003  ......... H04L 43/0894
(Continued)

OTHER PUBLICATIONS

Mehta et al., U.S. Appl. No. 14/661,336, filed Mar. 18, 2015.
(Continued)

*Primary Examiner* — Charles C Jiang
*Assistant Examiner* — Saad Khawar
(74) *Attorney, Agent, or Firm* — Treyz Law Group, P.C.; Michael H. Lyons; Tianyi He

(57) ABSTRACT

A packet forwarding network may include switches that forward network traffic between end hosts that are coupled to the forwarding network. An analysis network may be connected to the forwarding network. A controller may control the switches in the forwarding network to implement desired forwarding paths. The controller may configure the switches to form switch port groups. The controller may identify a port group that is connected to the analysis network. The controller may select a subset of the forwarded packets and may control selected switches to copy the subset to the identified port group. The controller may establish network tunnels between the switches and the port group. In this way, the controller may control the switches to perform efficient traffic monitoring regardless of the location on the forwarding network at which the traffic monitoring network is connected and without interfering with normal packet forwarding operations through the forwarding network.

24 Claims, 20 Drawing Sheets

(51) Int. Cl.
*H04L 12/709* (2013.01)
*H04L 12/721* (2013.01)

(52) U.S. Cl.
CPC .......... *H04L 43/062* (2013.01); *H04L 45/245* (2013.01); *H04L 45/38* (2013.01)

(56) References Cited

U.S. PATENT DOCUMENTS

| | | | |
|---|---|---|---|
| 7,710,867 B1* | 5/2010 | Masters | H04L 43/12 370/229 |
| 8,098,572 B2 | 1/2012 | Zhou et al. | |
| 8,300,523 B2 | 10/2012 | Salam et al. | |
| 8,321,555 B2 | 11/2012 | Gunther | |
| 8,321,938 B2 | 11/2012 | Strayer et al. | |
| 8,520,540 B1* | 8/2013 | Foschiano | H04L 43/0852 370/252 |
| 8,565,108 B1 | 10/2013 | Marshall et al. | |
| 8,566,649 B1 | 10/2013 | Bishara | |
| 8,665,699 B2 | 3/2014 | Bellagamba et al. | |
| 8,819,235 B2 | 8/2014 | Cardona et al. | |
| 9,184,995 B2 | 11/2015 | Leong | |
| 9,270,566 B2* | 2/2016 | Wang | H04L 43/026 |
| 2003/0105881 A1 | 6/2003 | Symons et al. | |
| 2003/0208618 A1 | 11/2003 | Mor et al. | |
| 2004/0013120 A1 | 1/2004 | Shen | |
| 2004/0139236 A1 | 7/2004 | Mehra et al. | |
| 2006/0031374 A1 | 2/2006 | Lu et al. | |
| 2006/0098589 A1 | 5/2006 | Kreeger et al. | |
| 2006/0218404 A1 | 9/2006 | Ogura | |
| 2008/0189769 A1 | 8/2008 | Casado et al. | |
| 2009/0080338 A1* | 3/2009 | Parker | H04L 12/24 370/250 |
| 2009/0080425 A1* | 3/2009 | Parker | H04L 12/4645 370/390 |
| 2010/0020680 A1 | 1/2010 | Salam et al. | |
| 2010/0080226 A1 | 4/2010 | Khalid et al. | |
| 2010/0195489 A1* | 8/2010 | Zhou | H04L 12/433 370/216 |
| 2010/0242093 A1 | 9/2010 | Zuk et al. | |
| 2010/0315943 A1 | 12/2010 | Chao et al. | |
| 2011/0087979 A1 | 4/2011 | Breslin et al. | |
| 2011/0268125 A1 | 11/2011 | Vobbilisetty et al. | |
| 2012/0250679 A1 | 10/2012 | Judge et al. | |
| 2013/0010600 A1 | 1/2013 | Jocha et al. | |
| 2013/0022767 A1 | 1/2013 | Klafke et al. | |
| 2013/0028072 A1 | 1/2013 | Addanki | |
| 2013/0058354 A1 | 3/2013 | Casado et al. | |
| 2013/0073743 A1 | 3/2013 | Ramasamy et al. | |
| 2013/0227670 A1 | 8/2013 | Ahmad et al. | |
| 2013/0242998 A1 | 9/2013 | Deshpande | |
| 2014/0036924 A1 | 2/2014 | Christenson | |
| 2014/0198649 A1 | 7/2014 | Jain et al. | |
| 2015/0215183 A1* | 7/2015 | Bucci | H04L 43/12 370/252 |

FOREIGN PATENT DOCUMENTS

| | | |
|---|---|---|
| EP | 2621136 | 7/2013 |
| EP | 2629464 | 8/2013 |
| WO | 01/63838 | 8/2001 |
| WO | 2013118873 | 8/2013 |

OTHER PUBLICATIONS

Pfaff et al., OpenFlow Switch Specification, Dec. 31, 2009, 42 pages.
Mehta et al., U.S. Appl. No. 13/754,671, filed Jan. 30, 2013.
Mehta et al., U.S. Appl. No. 13/776,419, filed Feb. 25, 2013.
Ramasubramanian et al., U.S. Appl. No. 14/337,161, filed Jul. 21, 2014.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 6B

| SOURCE IP ADDRESS | DESTINATION IP ADDRESS | ADDITIONAL MATCHING FIELDS | ACTION |
|---|---|---|---|
| IP1 | IP3 | * | COPY TO LAG1 AND ENCAPSULATE (USING TUNNEL ID) |
| IP3 | IP1 | * | COPY TO LAG1 AND ENCAPSULATE (USING TUNNEL ID) |
| .. | .. | | .. |

FIG. 11

| TUNNEL ID (E.G., VLAN ID) | OTHER MATCHING FIELDS | ACTION |
|---|---|---|
| ID1 | * | FORWARD TO LAG1 |
| ID50 | * | FORWARD TO LAG2 |
| ⋮ | ⋮ | ⋮ |

132

148 → (row 1)
149 → (row 2)

FIG. 12

| DESTINATION HARDWARE ADDRESS | SOURCE HARDWARE ADDRESS | ACTION |
|---|---|---|
| MAC 1 | MAC 2 | COPY INGRESS VERSION OF PACKET TO LAG1 AND ENCAPSULATE WITH TUNNEL ID |
| MAC 1 | MAC 2 | COPY EGRESS VERSION OF PACKET TO LAG1 AND ENCAPSULATE WITH TUNNEL ID |
| ... | ... | ... |

FIG. 17

SYSTEMS AND METHODS FOR CONTROLLING SWITCHES TO CAPTURE AND MONITOR NETWORK TRAFFIC

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It is often desirable to monitor network traffic that flows through a network. Conventional network monitoring often utilizes one or more network taps that are interposed between switches of the network. The network tap includes a monitor port that is directly coupled to a monitoring device and copies network traffic that flows between the switches of the network. The copied network traffic is provided to the monitoring device via the monitor port. However, it can be challenging to monitor networks using such arrangements as the networks increase in size and complexity. For example, in order to monitor network traffic at multiple network locations, network taps and corresponding monitoring devices must be provided at each of the network locations, which increases cost and leads to inefficient use of network monitoring resources.

It may therefore be desirable to be able to provide a network with improved network traffic monitoring capabilities.

SUMMARY

A packet forwarding network may include switches that perform network forwarding operations to forward network traffic (e.g., network packets) between end hosts that are coupled to the packet forwarding network. A traffic analysis network may be coupled to the packet forwarding network for performing network traffic monitoring operations on network packets forwarded by the forwarding network.

The controller may control the switches in the forwarding network to implement desired network forwarding paths for forwarding network packets between the end hosts. The controller may configure the switches in the network to form one or more switch port groups (e.g., link aggregation groups). For example, the controller may provide link aggregation mapping information to the switches that identifies the link aggregation groups and corresponding switch ports. The controller may identify a group of switch ports on at least one of the switches that is connected to the traffic analysis network. The controller may control a selected switch of the forwarding network to copy at least a portion of the network packets that are forwarded between the end hosts of the forwarding network to the identified group of switch ports without interfering with the packet forwarding operations of the forwarding network.

The controller may define a monitoring session (e.g., a subset of the network packets that are forwarded between the end hosts) on which to perform network traffic monitoring operations using the traffic analysis network (e.g., selected source and/or destination addresses of the network traffic to monitor, etc.). The controller may define a selected destination for the monitoring session (e.g., a particular traffic analysis network or system and a corresponding group of switch ports that is connected to the traffic analysis network). The controller may control at least one of the switches in the network to generate mirrored network packets by copying the selected subset of the network packets and may control the switches to forward the mirrored network packets to the identified group of switch ports connected to the traffic analysis network.

For example, the controller may control the selected switch to implement the desired network forwarding paths by providing flow table entries for a forwarding table and may control the selected switch to generate and forward the mirrored network packets by providing flow table entries for a mirroring table on the switch that is separate from the forwarding table. The mirroring table entries may include matching fields that match on the selected subset of the forwarded network packets to be monitored. The controller may provide at least one forwarding flow table entry to intervening switches located between the selected switch and the group of switch ports that is connected to the traffic monitoring network. The forwarding flow table entry may have a matching field that matches on the mirrored network packets generated by the selected switch and an action field that instructs the intervening switch to forward the mirrored network packets generated by the selected switch to the identified group of switch ports.

If desired, the mirroring table entry may instruct the selected switch to encapsulate the mirrored network packets using a selected tunnel identifier and the intervening switch may forward packets having the selected tunnel identifier to the identified group of switch ports. The controller may control the switches to implement any desired number of network tunnels between the switches and any desired number of traffic monitoring networks. If desired, the controller may instruct the switches to copy, encapsulate, and forward both ingress and egress versions of the network traffic to capture. In this way, the controller may control the switches to perform efficient and robust network traffic monitoring operations regardless of where on the forwarding network the traffic monitoring network is connected (and regardless of any potential changes to the network) and without interfering with normal packet forwarding operations through the network.

Further features of the present invention, its nature and various advantages will be more apparent from the accompanying drawings and the following detailed description.

BRIEF DESCRIPTION OF THE DRAWINGS

FIG. 6B is a diagram of an illustrative forwarding flow table of the type that may be used by a packet processing system showing three illustrative types of packet forwarding that may be performed based on the flow table entries of the flow table in accordance with an embodiment of the present invention.

FIG. 11 is a diagram of an illustrative mirroring table for use by a switch in capturing a selected subset of packets forwarded by the network for analysis using a traffic monitoring network in accordance with an embodiment of the present invention.

FIG. 12 is a diagram of an illustrative forwarding flow table that may be used by a switch for routing captured network packets to a link aggregation group that is connected to a traffic monitoring network in accordance with an embodiment of the present invention.

FIG. 17 is a diagram of an illustrative mirroring table for use by a switch in capturing ingress and egress versions of a network packet flow for analysis using a traffic monitoring network in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
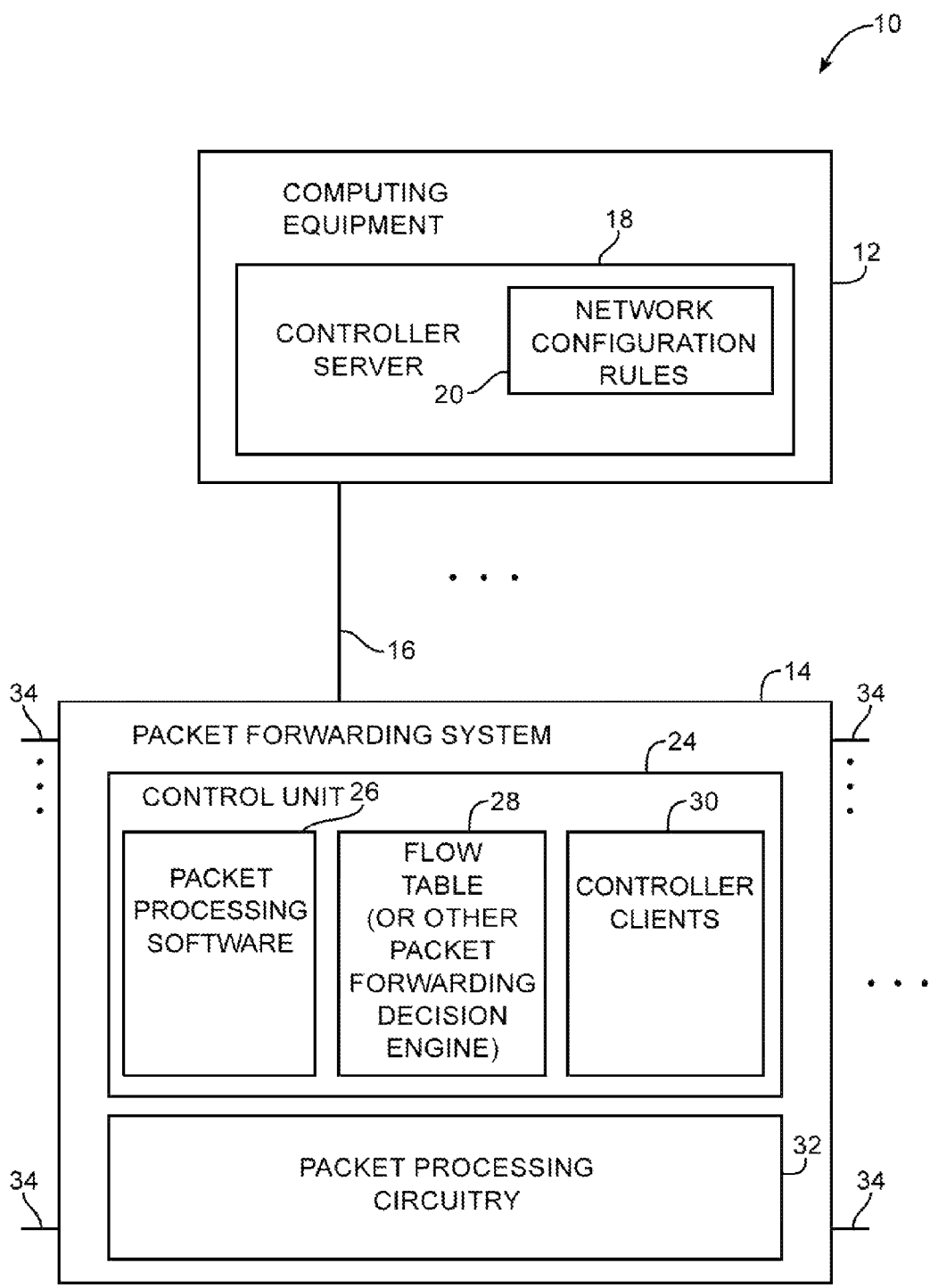
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
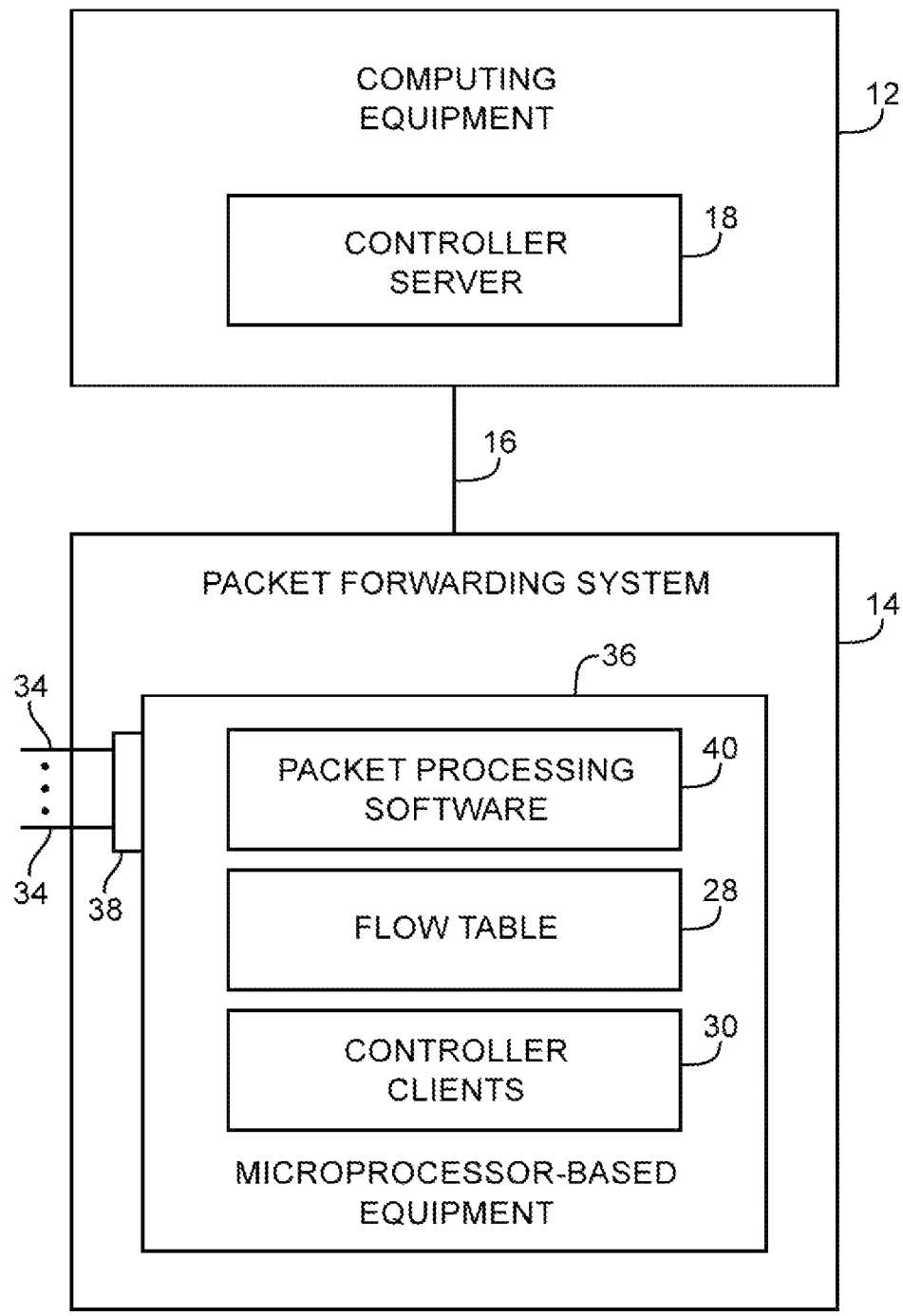
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
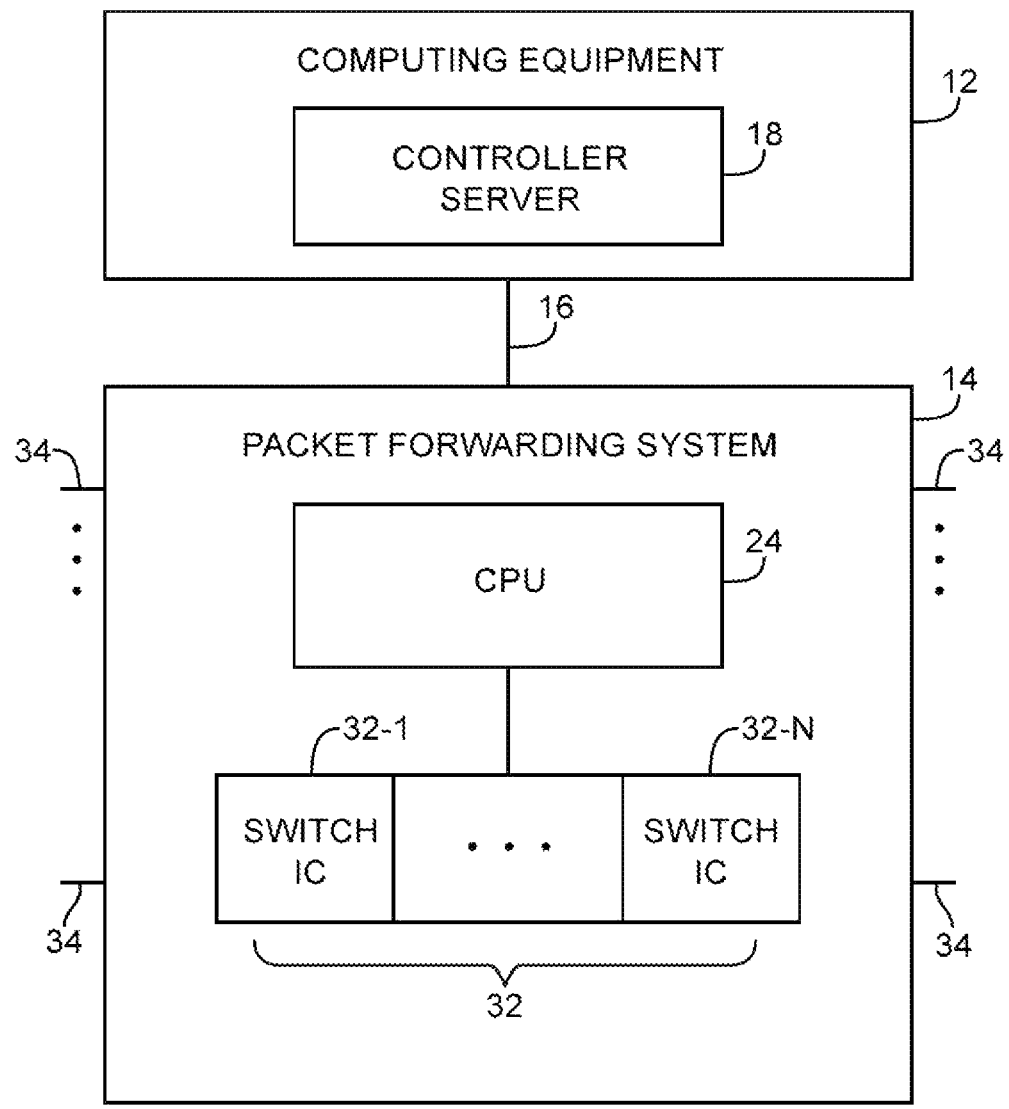
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
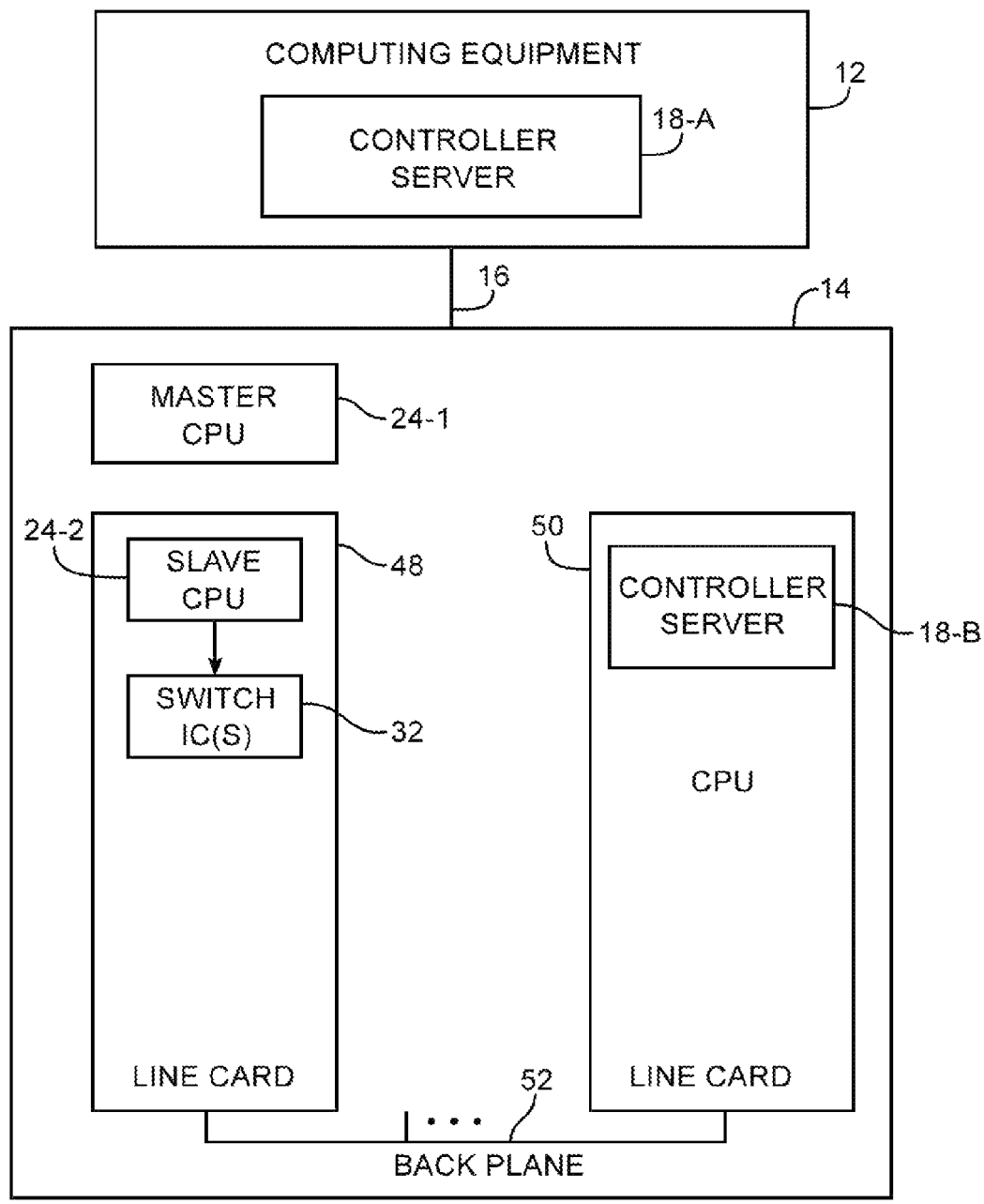
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
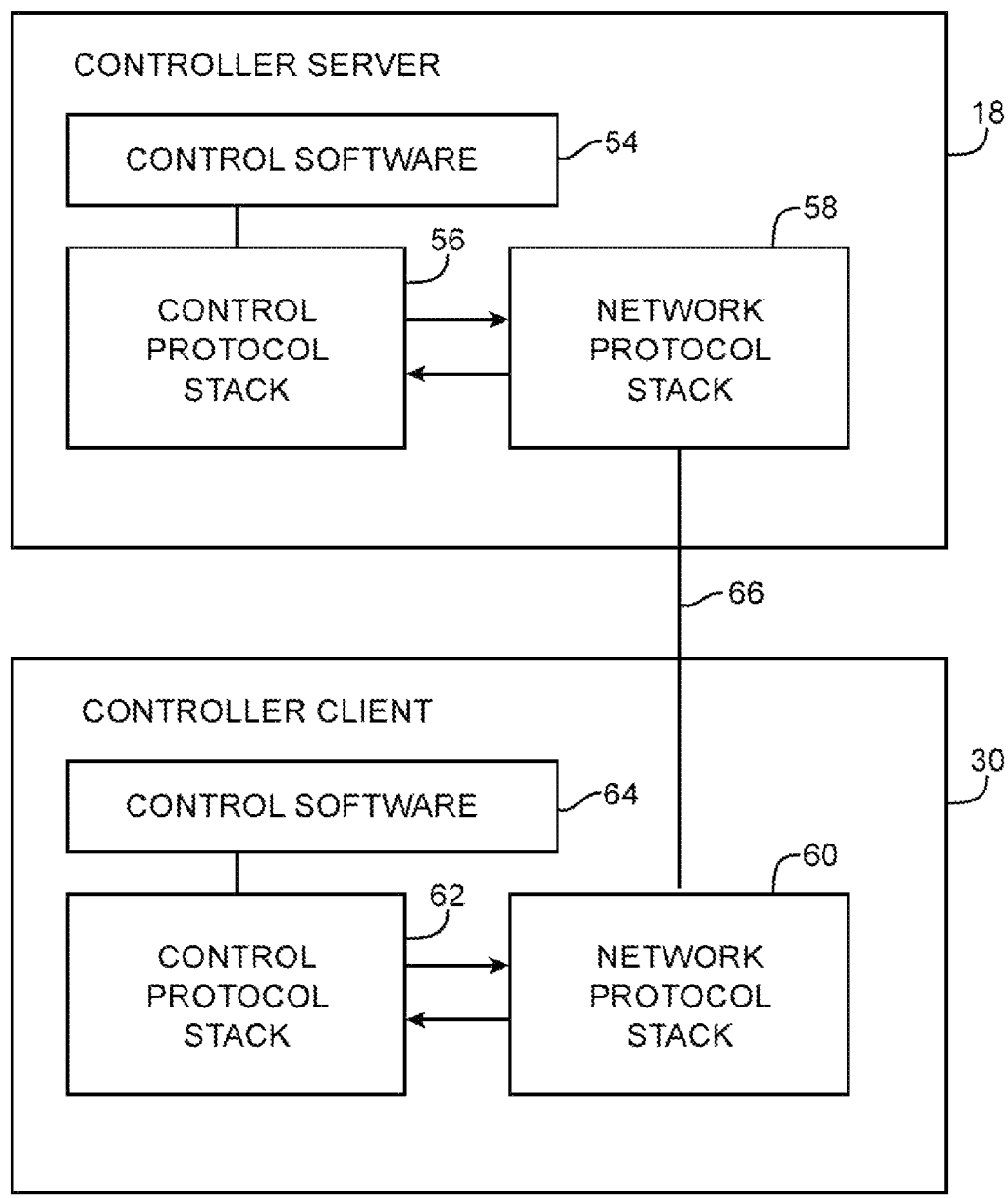
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
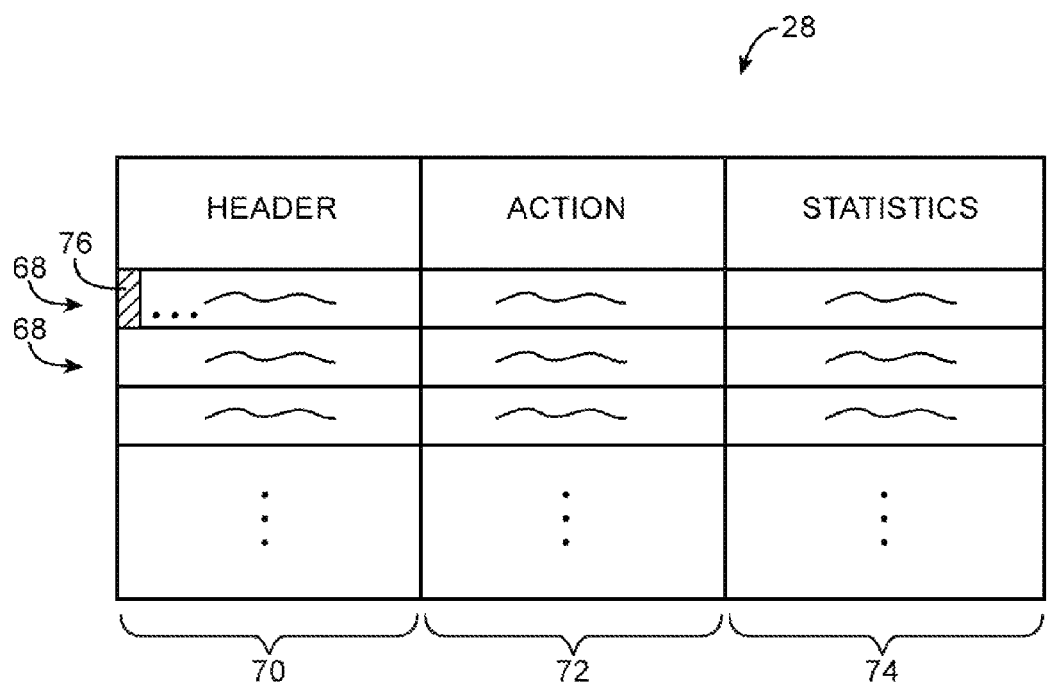
FIG. 6A is a diagram of an illustrative forwarding flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type (Ethertype), virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port, a copy action (e.g., to provide copied network traffic at an identified port), and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network (e.g., a path that implements desired network forwarding and configuration rules or policies).

Figure 7:
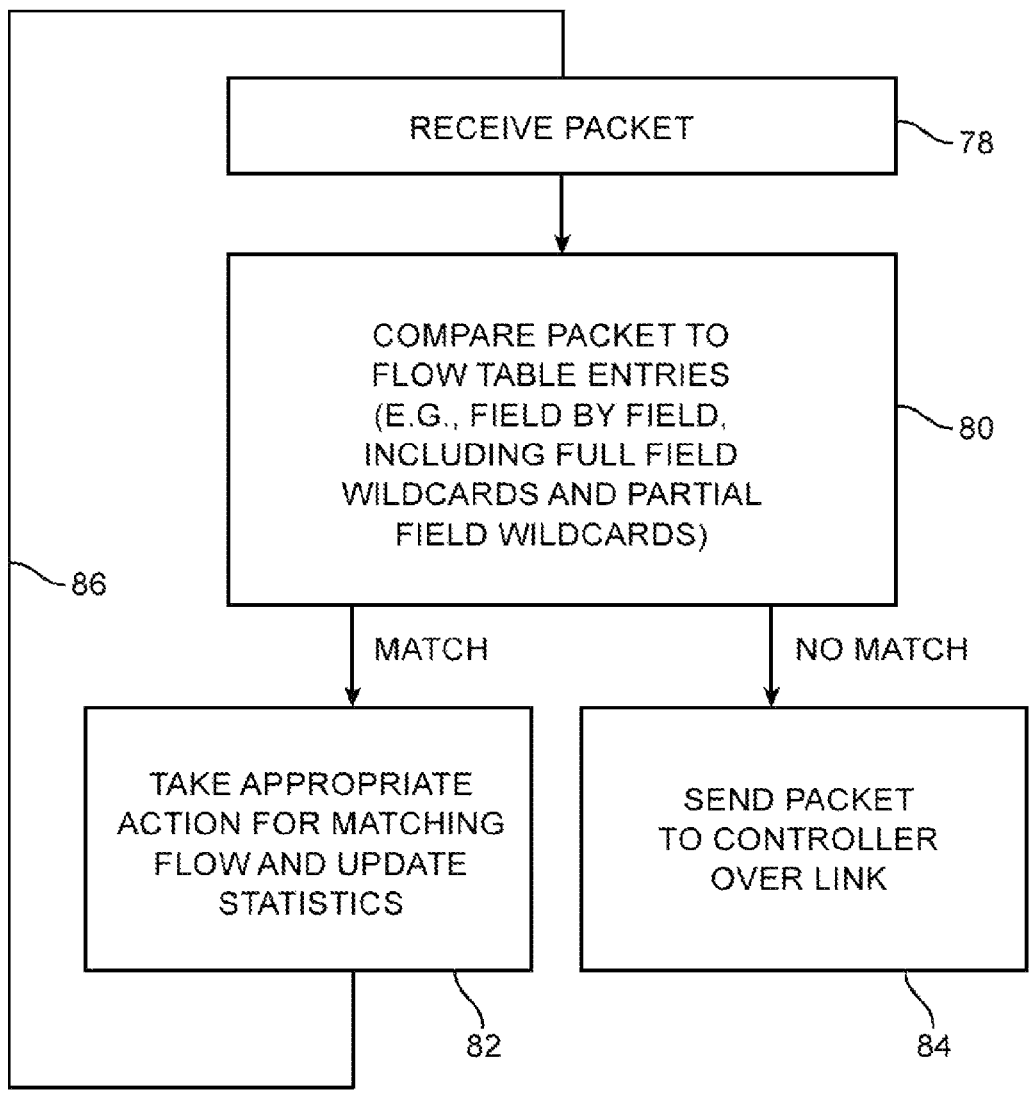
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
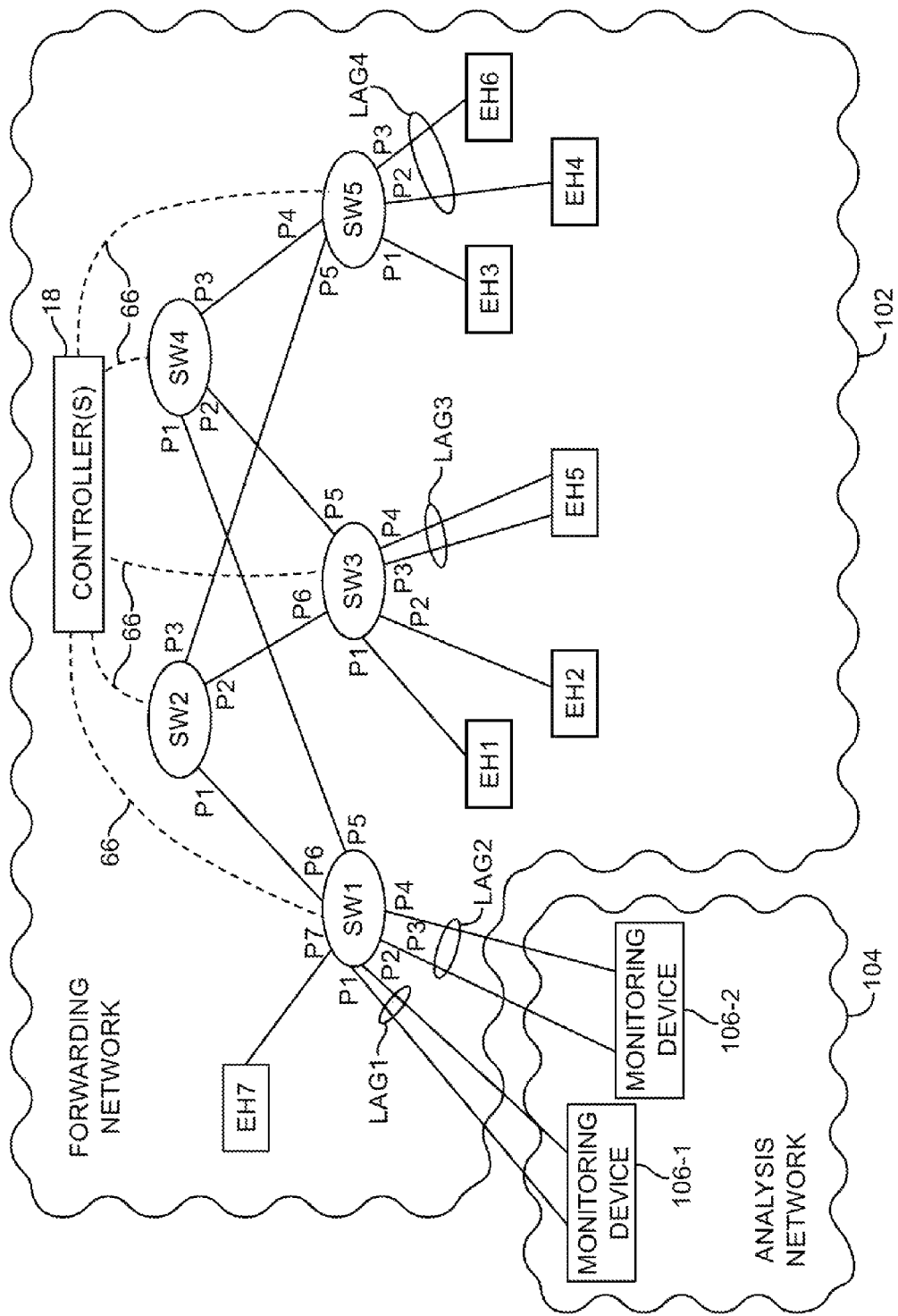
FIG. 8 is a diagram of an illustrative packet forwarding network including a controller that controls switches having switch ports organized in port groups and having a port group that is connected to a traffic monitoring network in accordance with an embodiment of the present invention.

As networks grow in complexity and size, there is increasing interest and need for network analysis and monitoring. It is generally desirable to perform such network analysis without interrupting normal network operations (e.g., without reducing network performance or affecting normal network traffic forwarding). However, it can be challenging to add network analysis devices to a network while efficiently utilizing network analysis resources. FIG. 8 is a diagram showing how switches of a network of switches such as forwarding network 102 may be controlled by a switch controller such as controller 18 to allow network traffic in network 102 to be monitored by a corresponding analysis network. For example, controller 18 may control the switches in forwarding network 102 to copy network traffic (e.g., a subset of the network packets routed through the network) and to forward the copied traffic to an analysis network for monitoring without interfering with normal network forwarding operations performed by forwarding network 102.

As shown in FIG. 8, an analysis network such as analysis network 104 (sometimes referred to herein as a monitoring network) may be connected to forwarding network 102 by one or more network paths. For example, switches (not shown) and/or other network devices (e.g., one or more monitoring devices 106) within analysis network 104 may be coupled to one or more switches or other network devices in forwarding network 102 via one or more network paths. In the example of FIG. 8, monitoring network 104 is connected to a switch SW1 in forwarding network 102 by multiple network paths.

Switches in analysis network 104 may be controlled by a corresponding controller (not shown) and/or by controller 18 in forwarding network 102, or may be operated without a corresponding controller. Analysis network 104 may include corresponding packet forwarding devices (e.g., switches) and one or more network analysis devices such as monitoring devices 106 (e.g., a first monitoring device 106-1, a second monitoring device 106-2, etc.). Analysis network 104 may perform network monitoring operations on forwarding network 102 (e.g., network traffic monitoring operations on network packets forwarded by the switches in forwarding network 102).

Network 102 may include packet forwarding devices (e.g., packet forwarding systems 14 as shown in FIGS. 1 and 2) such as switches SW1, SW2, SW3, SW4, SW5 that forward network traffic between network end hosts EH (e.g., a first end host EH1, a second end host EH2, a third end host EH3, etc.). Network 102 may sometimes be referred to herein as a forwarding network, packet forwarding network, production network, or production forwarding network, whereas analysis network 104 may sometimes be referred to herein as a monitoring network. Network 102 may be coupled to any desired number of distinct analysis networks 104 via any number of desired network locations within network 102 (e.g., switch SW3 may have one or more ports coupled to a corresponding analysis network and/or may have a port coupled to analysis network 104, switches SW1 and SW3 may both have ports coupled to analysis network 104, switch SW5 may have multiple ports connected to different analysis networks, etc.).

Switches SW1, SW2, SW3, SW4, and SW5 of network 102 may be controlled by controller 18 and may sometimes be referred to as client switches (e.g., switches SW1, SW2, SW3, SW4, and SW5 may include controller clients that communicate with controller 18 via control paths 66). The example of FIG. 8 is merely illustrative. In general, forwarding network 102 may include any desired number and arrangement of switches SW coupled to any desired number of end hosts EH. Any number of controllers 18 may be used for controlling the switches of forwarding network 102. If desired, network 102 may include switches that do not communicate with controller 18 via control paths 66 (e.g., because the switches do not include controller clients) that may be referred to as non-client switches (not shown for the sake of clarity). Non-client switches may, if desired, include controller clients that communicate with different controllers (i.e., not controller 18).

Each switch of networks 102 and 104 may include corresponding physical ports (e.g., ports 34 of FIG. 1) to which other network elements such as other switches or end hosts may be coupled to via network links (paths). For example, switch SW1 may include ports P1, P2, P3, P4, P5, P6, and P7, switch SW3 may include ports P1, P2, P3, P4, P5, and P6, switch SW4 may include ports P1, P2, P3, etc. One or more switch ports in forwarding network 102 may be coupled to monitoring network 104 (e.g., to switches and/or monitoring devices 106 in network 104). In the example of FIG. 8, ports P1, P2, P3, and P4 of switch SW1 are coupled to monitoring network 104, whereas port P5 of switch SW1 may be coupled to switch SW4, port P6 is coupled to switch SW2, and port P7 is coupled to an end host EH7. Similarly, ports P1, P2, and P3 of switch SW2 may be coupled to switches SW1, SW3, and SW5, respectively. Controller 18 may identify which switch ports of forwarding network 102 are connected to monitoring network 104 and may use information about which switch ports are connected to monitoring network 104 when generating network forwarding rules (e.g., flow table entries) for the switches in forwarding network 102.

Monitoring devices 106 such as monitoring devices 106-1 and 106-2 may be coupled to switches within analysis network 104 (not shown for the sake of clarity). Monitoring devices 106 may each include corresponding network analysis tools (sometimes referred to herein as monitoring tools) for monitoring network performance and network traffic associated with forwarding network 102 such as network performance monitors (e.g., tools that monitor the efficiency of network forwarding in network 102 and/or that monitor network 102 for bugs or defects), network visibility analysis tools, network capacity analysis tools, network outage analysis tools, network intrusion detection tools, network traffic recording tools, application specific monitoring tools (e.g., Voice Over IP (VOIP) performance monitoring tools), network debugging tools, or other network analysis tools for analyzing portions or all of production network 102 based on tapped network traffic flows. The network analysis tools may, for example, be implemented on computing equipment that serve as end hosts of analysis network 104 (e.g., monitoring devices 106 may serve as end hosts of analysis network 104).

In one suitable arrangement, forwarding network 102 may be implemented in one or more network racks of a rack-based system (e.g., using the resources of a line card or other computing equipment of the network racks). In this arrangement, network 102 may include so-called top-of-rack switches that serve to convey traffic between other switches and portions of network 102 and that are coupled to end hosts and core switches that are coupled to each top-of-rack switch without being coupled to end hosts (e.g., in scenarios where network 102 is formed in a rack-based system, switches SW1, SW3, and SW5 may be top-of-rack switches whereas switches SW2 and SW4 may be core switches). For example, top-of-rack switches in a rack-based system are sometimes referred to as leaf switches (e.g., switches SW1, SW3, and SW5 of FIG. 8 may be leaf switches), whereas switches (e.g., core switches) that are coupled to each of the leaf switches are sometimes referred to as spine switches (e.g., switches SW2 and SW4 may be spine switches). Spine switches may be core switches that are not connected to any end hosts (e.g., as shown in FIG. 8) or may have one or more ports that are connected to end hosts.

If desired, analysis network 170 may be implemented using one or more racks of the rack-based system (e.g., one or more network racks on which forwarding network 102 is implemented or on separate network racks). This example is merely illustrative and, in general, any desired network arrangement may be used to implement forwarding network 102 and analysis network 104.

Controller 18 may control switches SW in network 102 to perform desired network forwarding operations on network packets transmitted between end hosts EH. For example, controller 18 may provide flow table entries to the switches in network 102 to implement desired forwarding paths for network packets (e.g., network packets generated at or destined for end hosts EH within network 102 or networks external to network 102). As an example, controller 18 may provide flow table entries to switch SW3 that control how network packets are forwarded through network 102 (e.g., flow table entries such as shown in FIGS. 6A and 6B).

Controller 18 may control switches SW in network 102 to "tap" network traffic flows in network 102 by capturing a desired subset of the network traffic (e.g., network packets) forwarded using switches SW in forwarding network 102. Switches SW in network 102 may "capture" the subset of the network packets by copying the subset of network packets and forwarding the copied packets to analysis network 104. The switches SW in network 102 may thereby provide network packet copying functionality such as packet mirroring functionality that is controlled by controller 18. Controller 18 may identify the particular subset of network packets forwarded using switches SW to capture (sometimes referred to herein as a network monitoring session or monitoring session).

Packet copying operations may be performed by switch SW independently from packet forwarding operations. The switches may perform packet mirroring by copying desired network packets and forwarding the copied network packets to analysis network 104 without interfering with normal network traffic flow (e.g., of the network packets that were copied or of other network packets that are not copied) between the end hosts of network 102. For example, switch SW3 may be controlled to copy some or all of the network packets received at switch SW3 and to forward the copied network packets to analysis network 104 (e.g., via intervening switches SW1 and SW2 or via intervening switches SW4 and SW1) without disrupting forwarding of those network packets to a desired destination. The desired subset of network traffic may thereby by "tapped" by analysis network 104 and may be monitored by analysis network 104 while allowing forwarding network 102 to continue normal packet forwarding operations between end hosts EH.

Packet mirroring at switches SW in network 102 may be implemented by providing flow table entries that direct the switches to copy network traffic and provide the copied network traffic to one or more switch ports that are connected to analysis network 104. If desired, controller 18 may provide flow table entries for performing network forwarding operations (e.g., as shown in FIGS. 6A and 6*b*) to switches SW and may provide separate flow table entries for performing traffic mirroring (e.g., to the analysis network). For example, switches SW may store separate flow tables for performing network forwarding operations and for performing packet mirroring, respectively. If desired, controller 18 may provide a first set of flow table entries for a packet forwarding flow table and a second set of flow table entries for a mirroring flow table (e.g., a flow table that is separate from the packet forwarding flow table) for performing packet mirroring to provide copies of received network packets to monitoring network 104.

Figure 9:
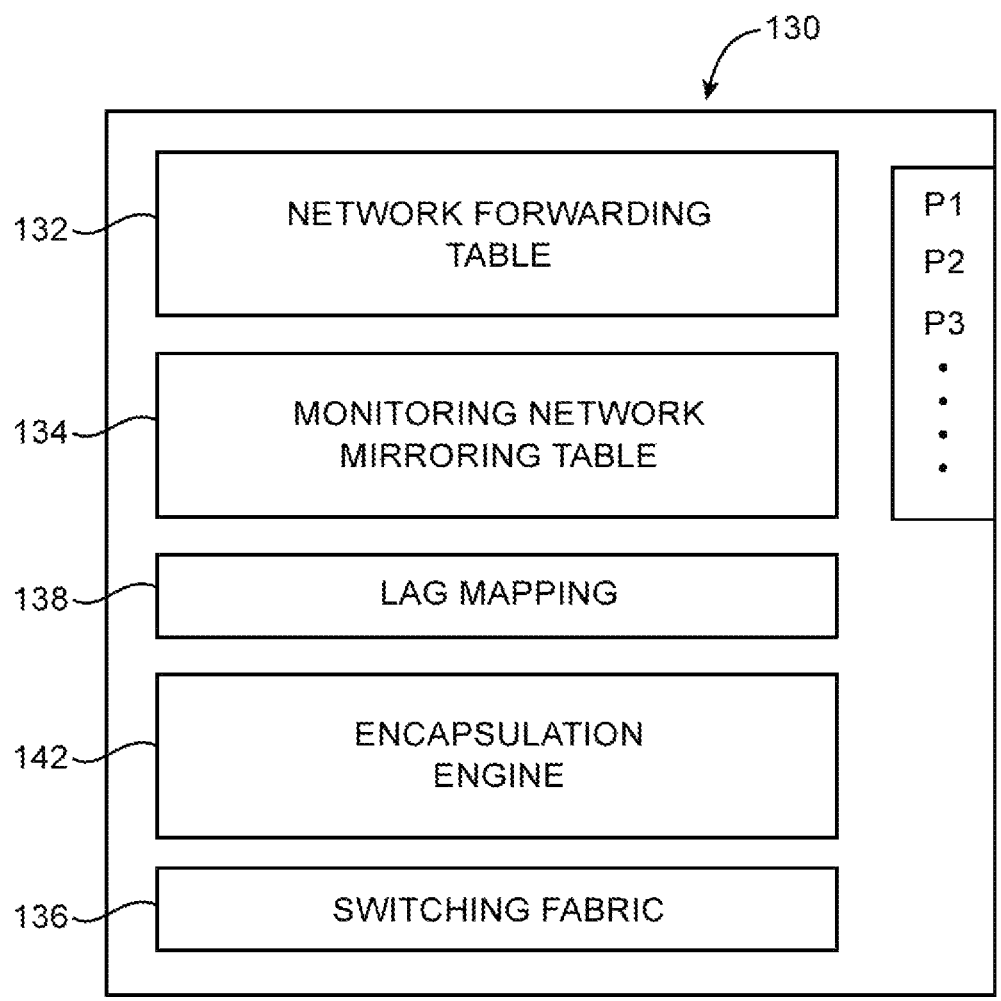
FIG. 9 is a diagram of an illustrative switch having a network forwarding table for forwarding packets between end hosts and a mirroring table for capturing a subset of the forwarded packets for analysis using a traffic monitoring network in accordance with an embodiment of the present invention.

FIG. 9 is an illustrative block diagram of a switch 130 such as a given switch SW of production network 102 (FIG. 8). Switch 130 may, for example, be a switch having ports coupled to one or more end hosts EH such as switch SW1, SW3, or SW5 of FIG. 8 (e.g., a so-called "edge" switch at the edge of the forwarding network that is coupled to end hosts of the network) or may be a switch having ports that are coupled to other switches without being coupled to end hosts such as switches SW2 or SW4 (e.g., a so-called "core" switch). Switch 130 may, if desired, have one or more ports that are connected to analysis network 104 (e.g., such as switch SW1).

As shown in FIG. 9, switch 130 may include network ports such as ports P1, P2, P3, etc. Switch 130 may include flow tables for routing network packets through network 102 (e.g., from a packet source to a packet destination) such as network forwarding (flow) table 132 (e.g., a flow table such as flow table 28 of FIGS. 2, 6A, and 6B). Switch 130 may match network packets received over a corresponding port to flow table 132 and may forward matching network packets according to an action field of the matching entry in flow table 132. Network forwarding flow table 132 may include Open Systems Interconnection model (OSI) Layer-2 (L2) forwarding tables (e.g., tables having entries that match Ethernet address headers of incoming packets), Layer-3 (L3) forwarding tables (e.g., tables having entries that match IP address headers of incoming packets), and/or forwarding tables that match on any desired network packet attributes. In general, network forwarding flow table 132 may include any desired fields for matching incoming network packets that direct switch 130 to route the network packets to an appropriate packet destination in network 102.

Switch 130 may include packet mirroring tables that are separate from flow table 132 and that are used for capturing one or more network packet flows in network 102 for monitoring such as mirroring table 134. Mirroring table 134 may include mirroring table entries having matching fields that match on a desired set of network packets and corresponding action fields that specify that copies of the matching packets are to be forwarded to monitoring network 104. If desired, switch 130 may include multiple mirroring tables 134.

Switch 130 may include switching circuitry such as switching fabric 136. Switching fabric 136 may be configured to route the network packets to the appropriate port (e.g., based on determinations made in flow table module 132) or to route copied network packets to the appropriate port so that network packets are forwarded to a desired portion of network 102 and so that the copied network packets are routed to monitoring network 104. A network packet received at one of the switch ports may be processed by flow table module 132 in determining how to forward the network packet. The operations performed by flow table 132 may be controlled by controller 18 (e.g., based on flow table entries generated for table 132). The entries in flow table 132 may be generated by controller 18 based on desired network policies for network 102 (e.g., desired packet routing rules, access control lists, or other network policies) for controlling normal network packet forwarding throughout network 102.

Mirroring flow table 134 may be generated by controller 18 and may be provided to switch 130 for performing traffic monitoring operations on network 102 using one or more corresponding analysis networks such as network 104. Mirroring table 134 may be provided concurrently with flow table entries in flow table 132, after flow table entries 132, before flow table entries 132, during set up of network 102, when an administrator or user of controller 18 desires to perform network monitoring operations on the network, or at any other desired time. Mirroring table 134 may include flow table entries that match network packets received from flow table 132 (e.g., network packets may first be matched on flow table 132 and then may subsequently be matched on debug table 134) or that match network packets received from the switch ports prior to providing the network packets to forwarding table 132, etc.

Mirroring tables 134 implemented on switch 130 may be defined herein as flow tables of packet mirroring entries (e.g., flow table entries specifically generated for performing packet mirroring operations) that match on received network packets, where the action field of the mirroring table entries specify that the matching packet is to be copied and the copy of the packet is to be forwarded to a network traffic monitoring network such as network 104. In contrast with flow table 132, mirroring table 134 does not contain action fields associated with forwarding of the network packets themselves through network 102 (e.g., from a packet source end host to a packet destination end host). Mirroring table 134 may match on ingress network packets (e.g., packets received from the switch ports prior to being provided to an input of switching fabric 136) and/or on egress network packets (e.g., packets outputted by switching fabric 84 for transmission from switch 130).

Mirroring table 134 may be separate and distinct from flow table 132. Modules 132 and 134 may be implemented using respective dedicated circuitry, may be implemented using shared dedicated circuitry, or may be implemented using software on processing circuitry. For example, these modules may be implemented using packet processing software 26 of FIG. 1 and/or packet processing circuitry 32 and may perform functions based on control messages (e.g., flow table entries) provided by controller 18.

Switch ports on switches SW in network 102 may include physical or logical switch ports. If desired, a group of switch ports may serve as a logical switch port for layer 2 forwarding. For example, a switch may implement link aggregation that assigns a link aggregation group (LAG) to groups of ports of the switch. Link aggregation groups (sometimes referred to herein as LAGs, LAG groups, port groups, or groups of ports) may be formed from any desired sets of ports of a network element such as a switch SW in network 102. Sets of ports in network 102 may be assigned (e.g., using controller 18) to different LAG groups.

In the example of FIG. 8, controller 18 may configure switches SW to implement logical groups such as LAG groups LAG1, LAG2, LAG3, and LAG4 from respective groups of physical switch ports. For example, LAG group LAG1 may include ports P1 and P2 of switch SW1, LAG group LAG2 may include ports P3 and P4 of switch SW1, LAG group LAG3 may include ports P3 and P4 of switch SW3, and LAG group LAG4 may include ports P2 and P3 of switch SW5. This example is merely illustrative. Each LAG group identified by controller 18 may include any desired number of switch ports (e.g., one switch port, more than one switch port, three switch ports, four switch ports, etc.) from any desired number of switches SW (e.g., ports from a single switch such as LAG groups LAG1, LAG2, LAG3, and LAG4 or ports from multiple switches such as a LAG group that includes ports P5 from both switches SW3 and SW5). If desired, switches SW may include different ports that associated with different LAG groups (e.g., switch SW3 may have ports associated with both LAG groups LAG1 and LAG2).

Each LAG group implemented in network 102 may connect switches SW in network 102 with other network elements. As an example, switches SW may have LAG groups connected to other switches, LAG groups connected to end hosts, and one or more switches SW in network 102 may include LAG groups that are connected to monitoring network 104 (e.g., switch SW has first and second LAG groups LAG1 and LAG2 coupled to respective monitoring devices 106 in monitoring network 104). If desired, controller 18 may use LAG groups in network 102 to identify connections between switches SW and/or external networks such as analysis network 104 and may control packet forwarding through the network based on the LAG groups in network 102 (e.g., may provide flow table entries 132 to switches SW that instruct the switches to forward received packets to a desired LAG group in the network).

Switch 130 as shown in FIG. 9 may include a link aggregation mapping module such as LAG mapping module 138 that maintains databases or tables that identify mappings between link aggregation groups and corresponding switch ports. Network forwarding table 132 and/or mirroring table 134 may identify link aggregation groups from LAG mapping module 138 instead of switch ports when performing packet forwarding (of network packets or mirrored copies of the network packets), for example. If desired, switch 130 may perform optimizations such as traffic balancing between the switch ports of a link aggregation group to maximize packet forwarding efficiency through the network. In scenarios in which link aggregation groups are available for forwarding in network 102, forwarding table entries 132 and/or mirroring table entries 134 may direct the switch to forward network packets and/or copies of the network packets, respectively, to the link aggregation groups. In the example of FIG. 8, entries in mirroring table 134 may direct switch SW3 to send copied network packets destined for monitoring network 104 to link aggregation groups LAG1 and/or LAG2.

Figure 10:
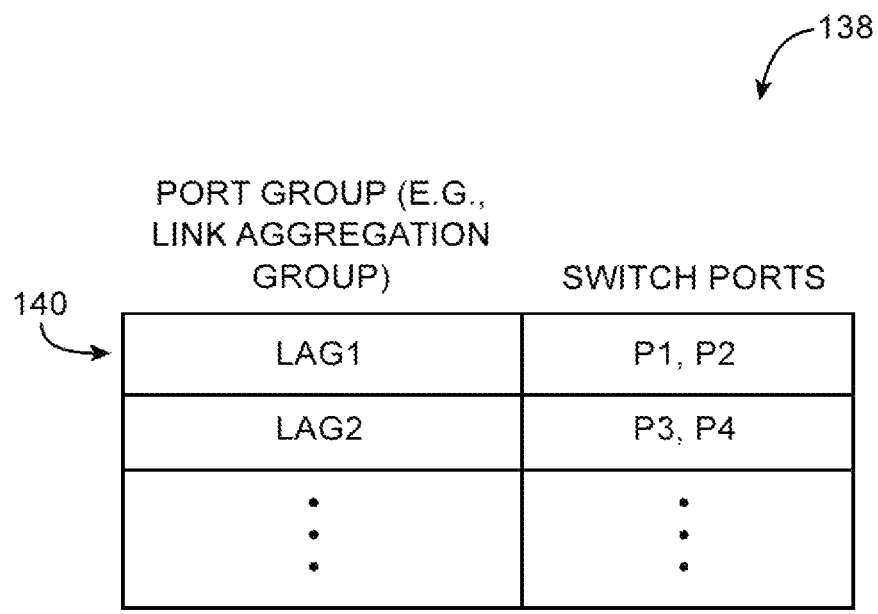
FIG. 10 is a diagram of an illustrative link aggregation table of a switch that may be configured by a controller for routing mirrored packets to a link aggregation group that is connected to a traffic monitoring network in accordance with an embodiment of the present invention.

FIG. 10 is an illustrative diagram of a potential link aggregation module 138 that includes port group (e.g., link aggregation) mappings for switch SW1 of FIG. 8. As shown in FIG. 10, link aggregation table 138 includes link aggregation table entry 140. Table entry 140 identifies that switch ports P1 and P2 of switch SW1 are mapped to link aggregation group LAG1. When forwarding module 132 determines that a network packet should be forwarded to link aggregation group LAG1 and/or when mirroring module 134 determines that a copy of the network packet should be forwarded to link aggregation group LAG1 (e.g., when it is desired to monitor traffic received at switch SW1 with monitoring tools 106-1 connected to LAG group LAG1), the corresponding entry 140 of link aggregation table 138 is used to determine that the network packet should be forwarded to one of switch ports P1 or P2. Similarly, when forwarding module 132 determines that a network packet should be forwarded to link aggregation group LAG2 and/or when mirroring module 134 determines that a copy of the network packet should be forwarded to link aggregation group LAG2 (e.g., such as when it is desired to monitor traffic received at switch SW1 with monitoring tools 106-2 connected to LAG group LAG2), the second entry of LAG mapping table 138 is used to determine that the network packet should be forwarded to one of switch ports P3 and P4. If desired, each link aggregation group that is determined by controller 18 for a switch may be updated by that switch in response to port failures (e.g., if a given port of a particular LAG group fails, other ports from that LAG group may be used to forward traffic routed to that LAG group without interrupting packet forwarding, and, if desired, new entries to mapping 138 may be generated).

Controller 18 may generate the entries for LAG mapping table 138 (e.g., based on the topology of network 102 and corresponding network forwarding rules) and may provide the entries to switches SW (e.g., over control paths 66). Controller 18 may generate different respective LAG table entries for each switch SW in network 102 so that each switch may maintain a corresponding LAG mapping table 138 that identifies that one or more of the ports of that switch or other switches in network 102 are assigned to a desired LAG group. Controller 18 may maintain and store information identifying all of the LAG groups implemented on switches SW in forwarding network 102 and may use the information to generate desired flow table entries and mirroring table entries for the switches. For example, controller 18 may identify all LAG groups connected to monitoring network 104 (sometimes referred to herein as tapping port groups, tapping LAG groups, monitoring port groups, or monitoring LAG groups) for use in performing traffic monitoring operations on network 102 (e.g., controller 18 may identify LAG groups LAG1 and LAG2 as tapping port groups).

Returning to FIG. 9, if desired, switch 130 may include a network packet encapsulation module such as encapsulation engine 142. In order to ensure that mirrored packets (e.g., network packets that are copied at the switches for network monitoring purposes) do not affect the performance of network traffic forwarding through network 102, switches SW may, if desired, generate a tunneling path (network tunnel) between that switch and a switch in network 102 that is connected to monitoring network 104 (e.g., switch SW1). For example, the tunneling path may be generated between that switch and the tapping LAG group of the switch that is connected to monitoring network 104 (e.g., tapping LAG group LAG1 of switch SW1). The switch SW in network 102 that is connected to monitoring network 104 (e.g., switch SW1) may sometimes be referred to herein as a tap point, tap, or tap switch. The network tunneling path may, for example, be a virtual local area network tunnel or any other desired network tunnel. This tunnel may be formed using encapsulation engine 142 at switch 130 to encapsulate the copied (mirrored) network traffic. A de-encapsulation engine on the tap switch (e.g., switch SW1) may de-encapsulate and thereby recover the copied network traffic prior to forwarding the copied traffic to monitoring network 104 for analysis. Encapsulation engines and de-encapsulation engines in network 102 may use encapsulation methods such as Generic Routing Encapsulation (GRE), Multiprotocol Label Switching (MPLS), Virtual Local Area Network (VLAN) encapsulation techniques, other techniques for encapsulating data for a network tunnel, etc.

The encapsulation and de-encapsulation engines implemented on switches SW of forwarding network 102 may be controlled and configured by controller 18. In the example of FIG. 8, controller 18 may control encapsulation engine 142 and the corresponding de-encapsulation engine on tapping switch SW1 to form a network tunnel that traverses switches in network 102 between the switch that encapsulated the packet and tapping switch SW1. For example, controller 18 may control client switch SW3 to copy network packets received from end host EH1 (e.g., at port P1) and send the copied packets to client switch SW1 using encapsulation engine 142 (e.g., by establishing a network tunnel over switch SW2 or SW4). The encapsulated and copied packets may be de-encapsulated at switch SW1 and the de-encapsulated copied packets may be forwarded to analysis tools 106 in network 104 via a selected port group (e.g., based on forwarding tables 132 and mirroring tables 134 provided to the switches by controller 18).

If desired, a user (e.g., network administrator) of controller 18 may identify network traffic to be captured and monitored using analysis network 104 (e.g., the user may provide a user input to controller 104 identifying a network monitoring session for analysis). Controller 18 may identify (e.g., based on the user input) a subset of the network traffic in forwarding network 102 to copy to analysis network 104 in the network monitoring session. For example, controller 18 may identify a network source and destination with which to capture traffic for analysis.

As an example, controller 18 may identify that all network traffic between end hosts EH1 and EH3 is to be provided to analysis network 104 for monitoring (e.g., a network analysis or monitoring session defined as all traffic sent between end hosts EH1 and EH3). Controller 18 may subsequently identify groups of switch ports (e.g., LAG groups) to which the captured traffic will need to be forwarded for analysis (e.g., LAG groups LAG1 and LAG2 connected to monitoring network 104). Controller 18 may generate mirroring flow table entries for mirroring tables 134 in the switches of forwarding network 102 that instruct the switches to implement the desired monitoring session (e.g., that instruct the switches to forward copies of all traffic between end hosts EH1 and EH3 to a LAG group connected to monitoring network 104). If desired, controller 18 may instruct multiple switches in network 102 to generate copies of the desired network traffic for capture. For example, controller 18 may generate mirroring table entries for switches SW3 and SW5 that instruct both switches to forward copies of network traffic between end hosts EH1 and EH3 to a port group connected to analysis network 104. In this way, controller 18 may robustly control network traffic flow monitoring at multiple points in the network (e.g., allowing for monitoring of the same flow at different points in the network in case the flows change between the different points).

In order to allow for monitoring network 104 and forwarding network 102 to perform multiple monitoring sessions at a given time without interfering with normal network forwarding operations, controller 18 may assign a tunnel identifier (tag) to the network tunnels between the switches in network 102 and the tapping switch (e.g., switch SW1). The switches may encapsulate the copied network packets using the corresponding tunnel identifier. If desired, controller 18 may generate a unique tunnel identifier (ID) for the network tunnels associated with each different network monitoring session (e.g., with each selected subset of the network traffic to be captured by monitoring network 104 in scenarios where controller 18 desires multiple network traffic flows to be monitored at once).

As an example, controller 18 may establish a first monitoring session to capture all traffic received by switch SW4 and may establish a first network tunnel between switch SW4 and tapping switch SW1 by instructing switch SW4 to encapsulate copied traffic using a first tunnel ID (e.g., using mirror table entries 134 provided to switch SW4). Controller 18 may establish a second monitoring session to capture all traffic received by switch SW5 by instructing switch SW5 to encapsulate copied traffic using a second tunnel ID (e.g., using mirror table entries 134 provided to switch SW5). Controller 18 may implement the desired network tunnels by providing corresponding flow table entries for forwarding table 132 to the intervening switches in network 102. The tunnel IDs of the encapsulated copied packets may be used by the intervening switches to implement the desired first and second network tunnels. For example, the intervening switches in network 102 may receive forwarding table entries 132 that instruct the switches to match received packets on the first and second tunnel IDs and to forward the matching packets to a tapping port group associated with the first and second tunnel (e.g., to a desired LAG group of switch SW1). In scenarios where multiple tapping switches are implemented, the tunnel IDs may allow for the intervening switches to forward encapsulated packets to the desired tapping switch based on the tunnel IDs of the received encapsulated packets.

FIG. 11 is an illustrative diagram of a potential mirroring flow table 134 that may be provided to the switches of forwarding network 102 for monitoring network traffic. One possible combination of matching fields for mirroring table 134 is shown in FIG. 11. In the example of FIG. 11, mirroring table entries 144 and 146 may be provided to at least switches SW3 (connected to end host EH1) and SW5 (connected to end host EH3) for capturing network traffic between end hosts EH1 and EH3 (as shown in FIG. 8). This example is merely illustrative and, in general, any desired network traffic may be captured (e.g., mirroring table 134 may match on any desired network packet fields or attributes).

In the example of FIG. 11, each entry of table 134 (e.g., flow table entries 144 and 146) may include a source IP address matching field, a destination IP address matching field, and additional matching fields such as header fields 76 described in connection with FIG. 6A. In particular, controller 18 may generate first mirroring table entry 144 having the IP address IP1 of end host EH1 as a source IP address matching field and the destination IP address IP3 of end host EH3 as a destination IP address matching field. Entry 144 may have wild carded additional matching fields and may thereby match on any layer 3 network traffic sent from end host EH1 to end host EH3. Entry 144 may have an action field that instructs the switch on which entry 144 is implemented to copy network packets having source IP address IP1 and destination IP address IP3 to LAG group LAG1 and to encapsulate the copied traffic using a corresponding tunnel ID (e.g., using encapsulation engine 142). The tunnel ID may be specific to the network monitoring session associated with entries 144 and 146 (e.g., the network monitoring session identified at controller 18 for capturing all traffic between end hosts EH1 and EH3).

Similarly, controller 18 may generate a second mirroring table entry 146 that instructs the switch to copy all network traffic having a source IP address IP3 and a destination IP address IP1, to forward the copied traffic to LAG group LAG1, and to encapsulate the copied packets using the tunnel ID associated with that monitoring session. The tunnel ID may be, for example, a VLAN ID tag, and may be the same for both mirroring table entries 144 and 146. As an example, a tunnel ID ID1 may be used to encapsulate the mirrored traffic associated with the corresponding monitoring session. If desired, additional monitoring sessions implemented on forwarding network 102 may be provided with different tunnel IDs so that the switches in network 102 may differentiate between different monitoring sessions (e.g., so that mirrored traffic associated with different analysis networks or sets of monitoring devices may be forwarded to the appropriate port group of network 102).

Controller 18 may provide entries 144 and 146 to switches SW3 and SW5 (and optionally to other switches in network 102). Controller 18 may provide flow table entries for network forwarding table 132 that instruct intervening switches in network 102 (e.g., switches between switches SW3 and SW4 such as switches SW1, SW2, and/or SW4) to forward traffic encapsulated using selected network tunnel IDs to monitoring network 104 (e.g., so that the copied and encapsulated network traffic may continue to be forwarded to network 104 without disrupting forwarding of the corresponding network packets from which the mirrored packets were copied).

Figure 12:
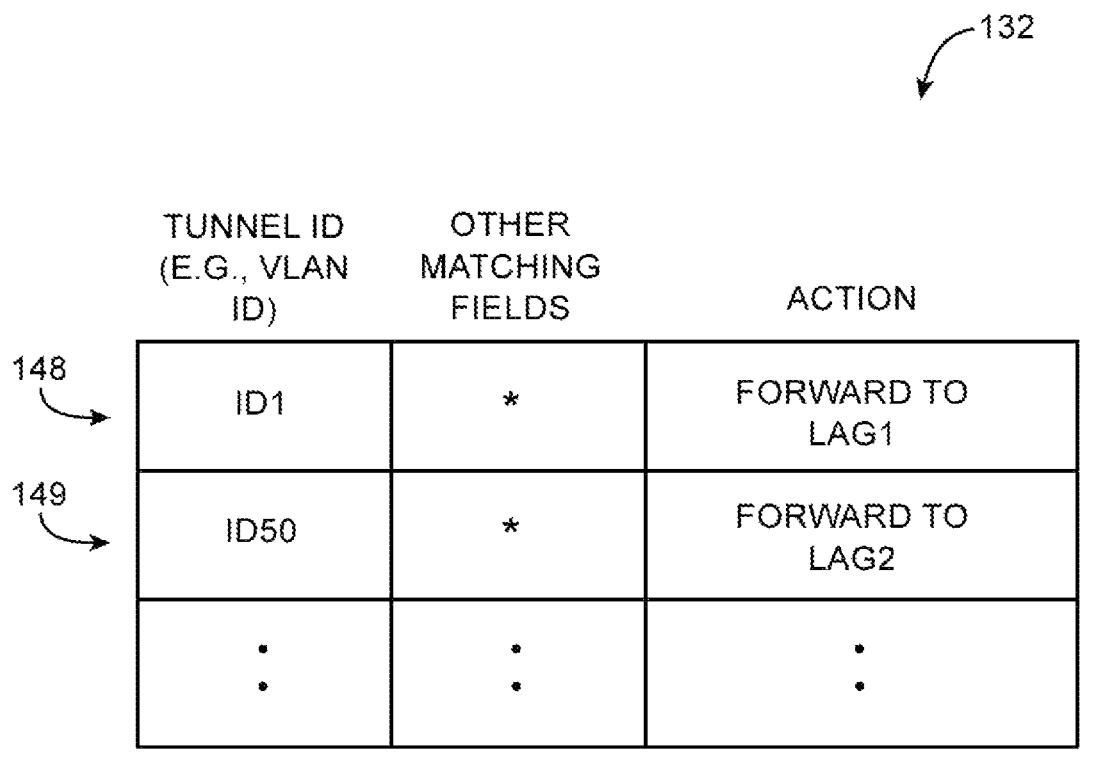

FIG. 12 is an illustrative diagram of flow table entries for forwarding table 132 that may be generated by controller 18 for implementing the desired monitoring session (e.g., for forwarding encapsulated and mirrored network traffic to monitoring network 104 along a corresponding network tunnel). As shown in FIG. 12, controller 18 may generate a forwarding table entry 148 that matches all network traffic encapsulated using a tunnel ID ID1, such as the encapsulated and mirrored network traffic generated at switches SW3 and SW5 using the mirroring table entries of FIG. 11. Forwarding table entry 148 instructs the switch on which it is implemented to forward all matching traffic (e.g., all traffic from the monitoring session associated with tunnel ID ID1) to LAG group LAG1 connected to monitoring network 104. In this way, the mirrored and tunneled traffic may be routed to analysis network 104 without interfering with normal packet routing operations in the network.

If desired, flow table 132 may include multiple entries (rows) associated with different monitoring sessions. Each monitoring session may be associated with a corresponding set of network tunnels having a respective tunnel ID (e.g., each network tunnel of the set may have a common tunnel ID). In this scenario, entries in table 132 may match on the different tunnel IDs so that the encapsulated and mirrored traffic from different sessions are forwarded to the desired monitoring devices and/or analysis network.

Consider an example in which, in addition to the monitoring session associated with tunnel ID ID1 that captures all traffic between end hosts EH1 and EH3, controller 18 identifies an additional monitoring session to capture all traffic produced by end host EH4 for analysis using monitoring tools on monitoring device 106-2. In this scenario, controller 18 may generate additional mirroring table entries for switch SW5 that instruct switch SW5 to copy all traffic having a source address field associated with end host EH5 (or all traffic received over a port connected to end host EH5, for example), to encapsulate the copied traffic using a second tunnel such as tunnel ID ID50, and to forward the encapsulated copied traffic to LAG group LAG2. Controller 18 may provide a corresponding forwarding table entry 149 to the switches in network 102 (e.g., all of the switches in network 102 or only those intervening switches in network 102 between switch SW5 and switch SW1) that instruct the switches to forward the mirrored traffic encapsulated using tunnel ID ID50 to LAG group LAG2 (e.g., the group of ports connected to selected monitoring device 106-2). In this way, mirrored traffic from the first monitoring session may be forwarded to monitoring device 106-1 associated with the first port group LAG1 and mirrored traffic form the second monitoring session may be forwarded to monitoring device 106-2 associated with second port group LAG2 without the need to match on any fields of the mirrored traffic other than the tunnel identifier.

Figure 13:
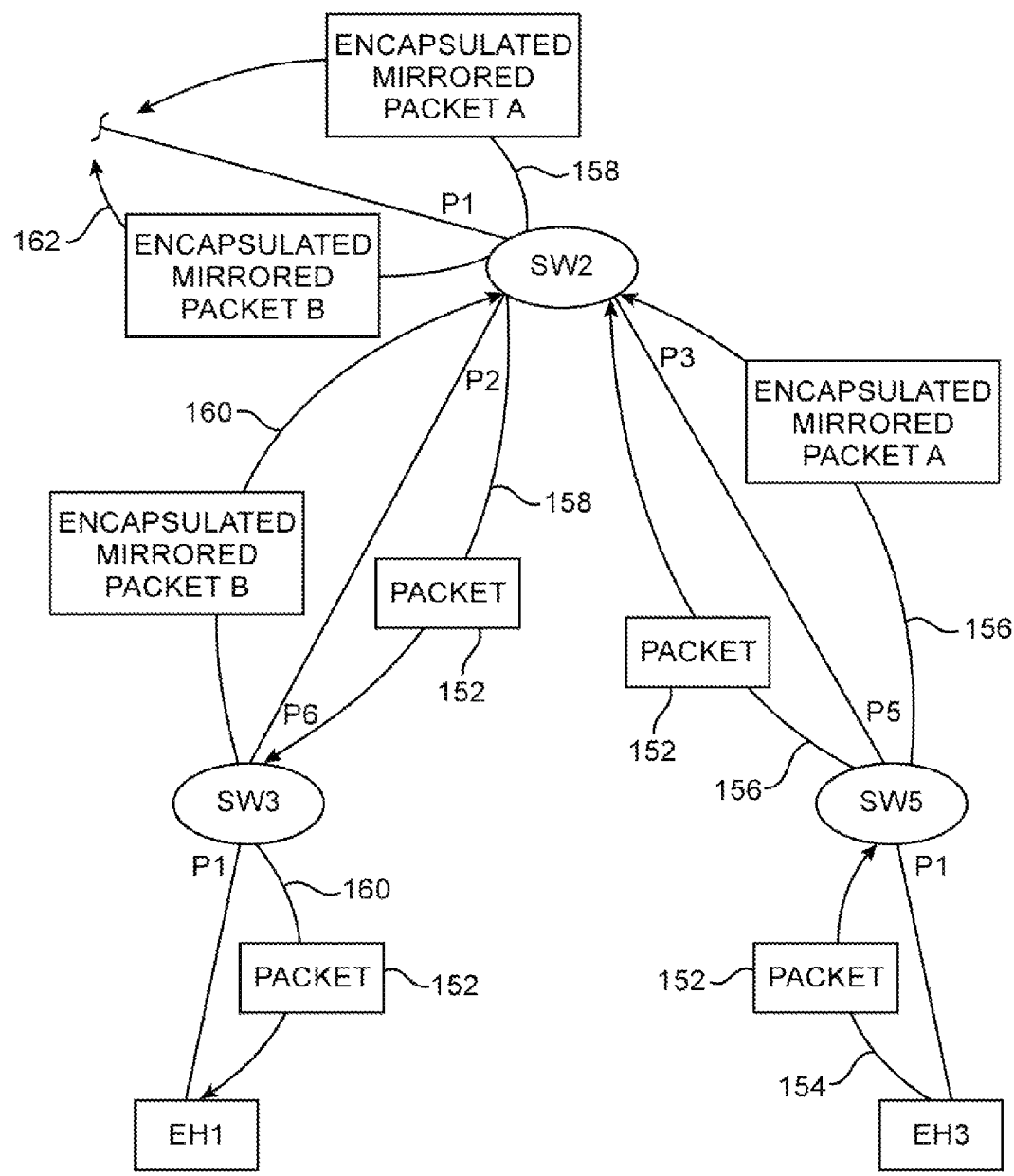
FIG. 13 is an illustrative flow diagram showing how switches be controlled to encapsulate and forward mirrored copies of network packets to a group of ports that is connected to a traffic monitoring network without disrupting normal packet forwarding through the network in accordance with an embodiment of the present invention.

FIG. 13 is an illustrative flow diagram showing how controller 18 may control the switches in network 102 to capture selected network traffic using a packet monitoring session associated with a mirroring table such as mirroring table 134 of FIG. 11. In the example of FIG. 13, controller 18 selects a monitoring session that identifies that all traffic between end hosts EH1 and EH3 of FIG. 8 is to be captured for monitoring using monitoring device 106-1 and controller 18 provides corresponding mirroring table entries (e.g., entries 144 and 146 of FIG. 11) and forwarding flow table entries (e.g., entries 148 of FIG. 12) to the switches in network 102 for implementing the selected monitoring session.

End host EH3 may generate a network packet 152 to be transmitted to end host EH1. Packet 152 may, for example, include a header with a source address field (e.g., a source hardware/MAC address field, a source IP address field, etc.) associated with end host EH3 (e.g., a source IP address IP3) and a destination address field (e.g., a destination hardware address field, a destination IP address field, etc.) associated with end host EH1 (e.g., a destination IP address IP1). Network packet 152 may be provided to switch SW5 (e.g., port P1 of switch SW5) at step 154.

Switch SW5 may compare packet 152 to forwarding table 132 and to mirroring table 134. Forwarding table 132 may include an entry that matches on packet 152 and that instructs switch SW5 to forward packet 152 to switch SW2 (e.g., based on the destination address field of the packet). Mirroring table 134 may include an entry that matches on packet 152 (e.g., because the corresponding monitoring session was generated to capture all traffic between end hosts EH1 and EH3). Switch SW5 may copy (mirror) packet 152 to generate a mirrored (copied) packet A and may encapsulate the mirrored packet A using tunnel ID ID1 to generate encapsulated mirrored packet A (e.g., a mirrored copy of packet 152 that has been encapsulated using tunnel ID ID1). In this way, controller 18 may control switch SW5 to establish a network tunnel associated with tunnel ID ID1 between switch SW5 and the tapping switch SW1. The matching entry of mirroring table 134 may instruct switch SW5 to forward encapsulated mirrored packet A (sometimes referred to herein as packet EA because it corresponds to an encapsulated version of the mirrored packet A) to LAG group LAG1 of switch SW1 for monitoring.

At step 156, packet 152 and encapsulated mirrored packet A (packet EA) may be forwarded to switch SW2. This example is merely illustrative and, if desired, one or both of packet 152 and encapsulated mirrored packet A may be forwarded to switch SW4 given the network topology of FIG. 8.

Switch SW2 may compare packet 152 and packet EA to corresponding forwarding table entries in flow table 132 (e.g., controller 18 may transmit mirroring table entries associated with the monitoring session to only switches SW3 and SW5 in this scenario). As an example, flow table 132 may include an entry that matches on packet 152 and that instructs switch SW2 to route packet 152 to switch SW3. Flow table 132 may include an additional entry such as entry 148 of FIG. 12 that matches on tunnel ID1 of packet EA and that instructs switch SW2 to forward packet EA to LAG group LAG1 of switch SW1 (e.g., based on information stored on LAG mapping module 138). In this way, controller 18 may control intervening switch SW2 to implement and maintain the network tunnel associated with tunnel ID ID1 between switch SW5 and tapping switch SW1 without the need for de-encapsulating packet EA (e.g., so that the switch can adequately distinguish between normal network traffic such as packet 152 and captured traffic such as encapsulated mirrored packet A and so that the switch can route encapsulated mirrored packet A without disrupting normal forwarding of network packet 152).

At step 158, switch SW2 may provide packet 152 to switch SW3 and may forward packet EA to switch SW1. Switch SW3 may compare packet 152 to its forwarding table 132 and to mirroring table 134. Forwarding table 132 may include an entry that matches on packet 152 and that instructs switch SW3 to forward packet 152 to end host EH1 (e.g., by matching on a destination address field of packet 152). Mirroring table 134 may include an entry that matches on packet 152 (e.g., because the corresponding monitoring session was generated to capture all traffic between end hosts EH1 and EH3). Switch SW3 may copy (mirror) packet 152 to generate a mirrored packet B and may encapsulate the mirrored packet B using tunnel ID ID1 corresponding to the selected monitoring session to generate encapsulated mirrored packet B (e.g., a mirrored copy of packet 152 that has been encapsulated using tunnel ID ID1 but that is separate from encapsulated mirrored packet A generated at switch SW5). In this way, controller 18 may control switch SW3 to establish an additional network tunnel associated with tunnel ID ID1 between switch SW3 and the tapping switch SW1 (e.g., an additional network tunnel associated with the selected monitoring session). The matching entry of mirroring table 134 may instruct switch SW3 to forward encapsulated mirrored packet B (sometimes referred to herein as packet EB because it corresponds to an encapsulated version of the mirrored packet B) to LAG group LAG1 of switch SW1 for monitoring.

At step 160, switch SW3 may provide packet 152 to destination end host EH1 and may provide packet EB to switch SW2. Switch SW2 may compare packet EB to corresponding forwarding table entries in flow table 132. Flow table 132 may match packet EB to entry 148 of FIG. 12 because mirrored packet B was encapsulated using the same tunnel ID1 of packet EA (e.g., in this way, a single flow table entry may be used to route multiple mirrored packets from multiple switches in the same monitoring session thereby conserving storage space on the switch). In this way, controller 18 may control intervening switch SW2 to implement and maintain the network tunnel associated with tunnel ID ID1 between switch SW3 and tapping switch SW1 without the need for de-encapsulating packet EB. At step 162, packet EB may be forwarded to switch SW1.

Figure 14:
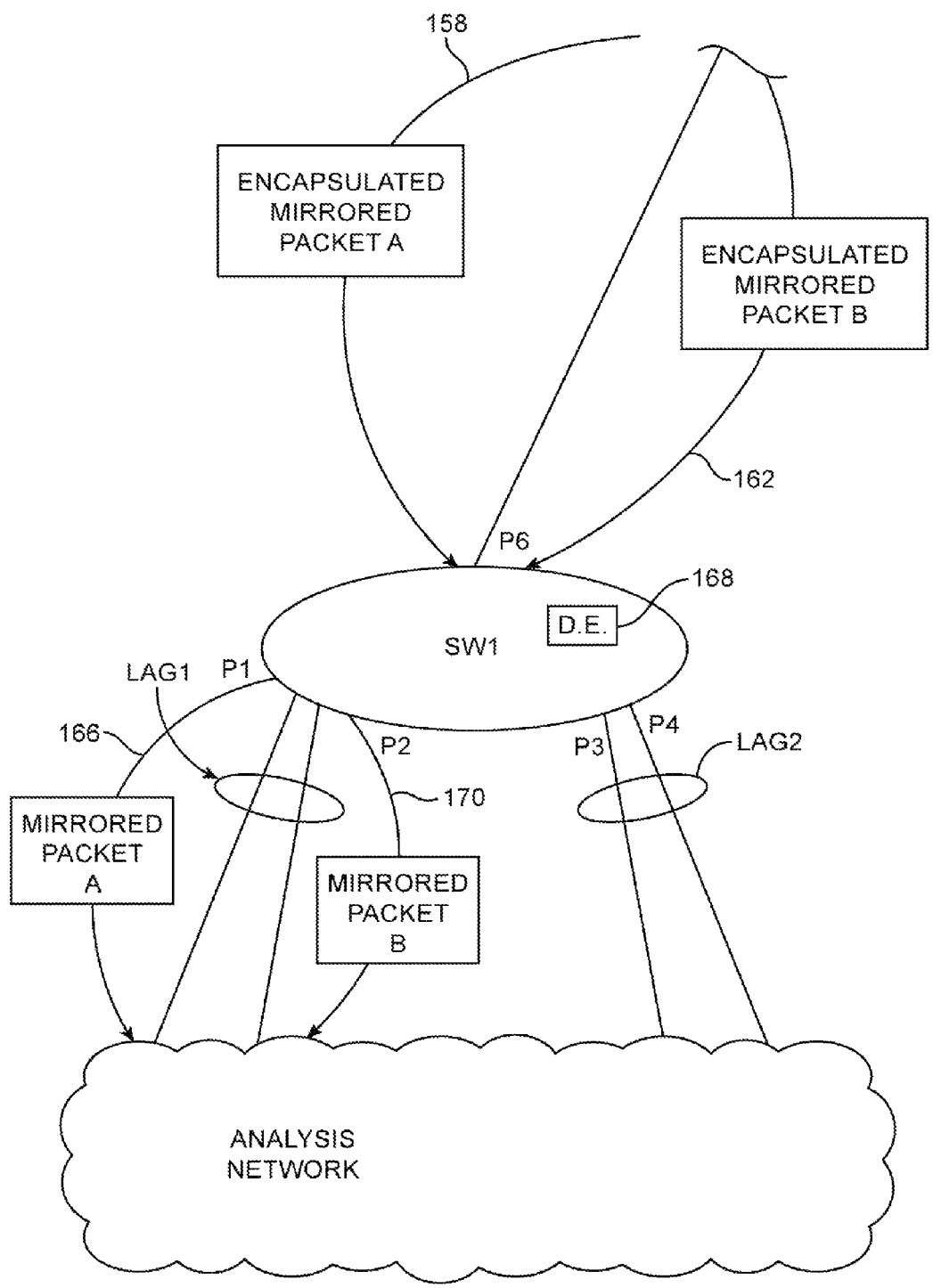
FIG. 14 is an illustrative flow diagram showing how a tapping switch on a forwarding network may de-encapsulate received mirrored copies of network packets for forwarding the mirrored copies of the network packets to a traffic monitoring network over a group of switch ports in accordance with an embodiment of the present invention.

FIG. 14 is an illustrative flow diagram showing how packets EA and EB may be routed from switch SW2 of FIG. 12 to monitoring network 104 by network tapping switch SW1 (e.g., when implementing the selected monitoring session corresponding to mirroring table 134 of FIG. 11). Switch SW1 may receive packet EA at step 158. Switch SW2 may compare packet EA to corresponding forwarding table entries in flow table 132. Flow table 132 may match packet EA to entry 148. Flow table 132 on the tapping switch (e.g., switch SW1) may further include an entry that matches on the encapsulated mirrored packets and that instructs the switch to de-encapsulate the encapsulated mirrored packets using de-encapsulation engine 168. De-encapsulation engine 168 may retrieve packet A from packet EA (e.g., a mirrored copy of packet 152 as received by switch SW5 in FIG. 13). Flow table 132 in switch SW1 may instruct switch SW1 to forward packet A to LAG group LAG1 (e.g., one of ports P1 or P2 of LAG group LAG1).

At step 166, switch SW1 may forward packet A to analysis network 104 (e.g., to first monitoring device 106-1). Similarly, switch SW1 may receive packet EB at step 162. Switch SW1 may de-encapsulate packet EB using de-encapsulation engine 168 to retrieve packet B and may forward packet B (a mirrored copy of packet 152 as received by switch SW3 in FIG. 13) to analysis network 104 at step 170 (e.g., based on the instructions of entries in flow table 132 on switch SW1 as provided by controller 18). In this way, multiple copies of a given network packet at different points in the network may be provided to analysis network 104 for a selected monitoring session without affecting normal network forwarding (e.g., normal forwarding of packet 152 between end hosts EH1 and EH3). Analysis network 104 may subsequently perform any desired traffic analysis and monitoring operations on the mirrored packets.

If desired, some of the switches in forwarding network 102 may have ports coupled to end hosts and ports coupled to analysis network 104. In the example of FIG. 8, switch SW1 may be coupled both to end host EH7 and to analysis network 104. In these scenarios, the switch may perform packet mirror operations without encapsulating the mirrored packets (thereby conserving processing resources and storage within the switch).

Figure 15:
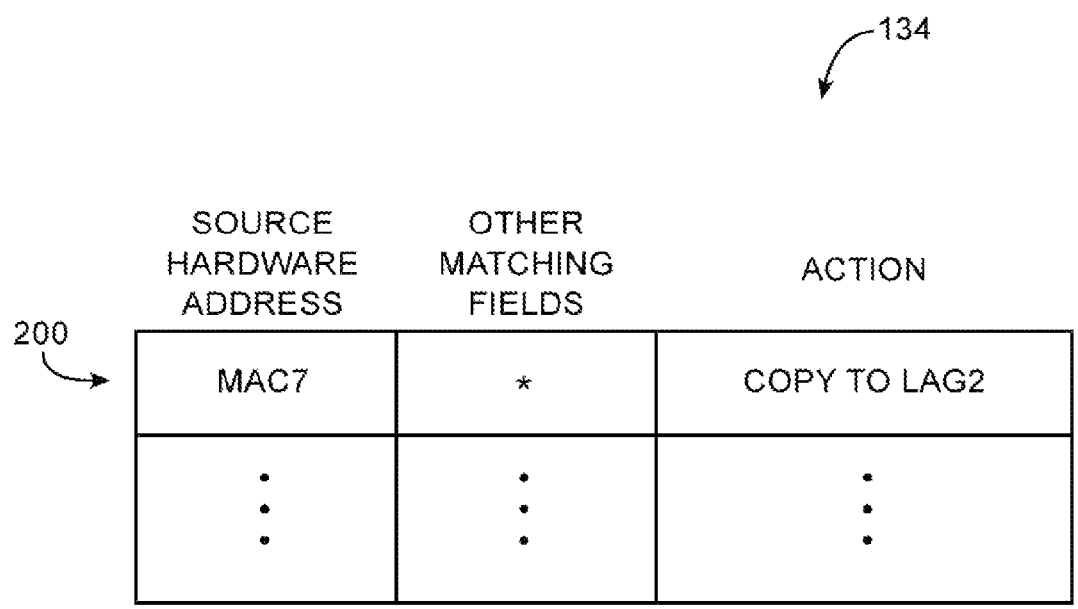
FIG. 15 is a diagram of an illustrative mirroring table for use by a switch for capturing network traffic to forward to a monitoring network over a corresponding group of switch ports without encapsulating the captured network traffic in accordance with an embodiment of the present invention.

FIG. 15 is an illustrative diagram of mirroring flow table entries that may be provided to a switch that is connected to monitoring network 104 for mirroring network traffic received from an end host connected to that switch. As shown in FIG. 15, controller 18 may generate a mirroring table entry 200 for mirroring table 134 on switch SW1 of FIG. 8. Controller 18 may select a monitoring session to capture all traffic generated by end host EH7 and to monitor the captured traffic using monitoring device 106-2 on analysis network 104. Mirroring table entry 200 may thereby match on all packets received from end host EH7 (e.g., packets having a source hardware address MAC7 of end host EH7) and may copy the matching packets to a selected group of switch ports (e.g., LAG group LAG2).

Figure 16:
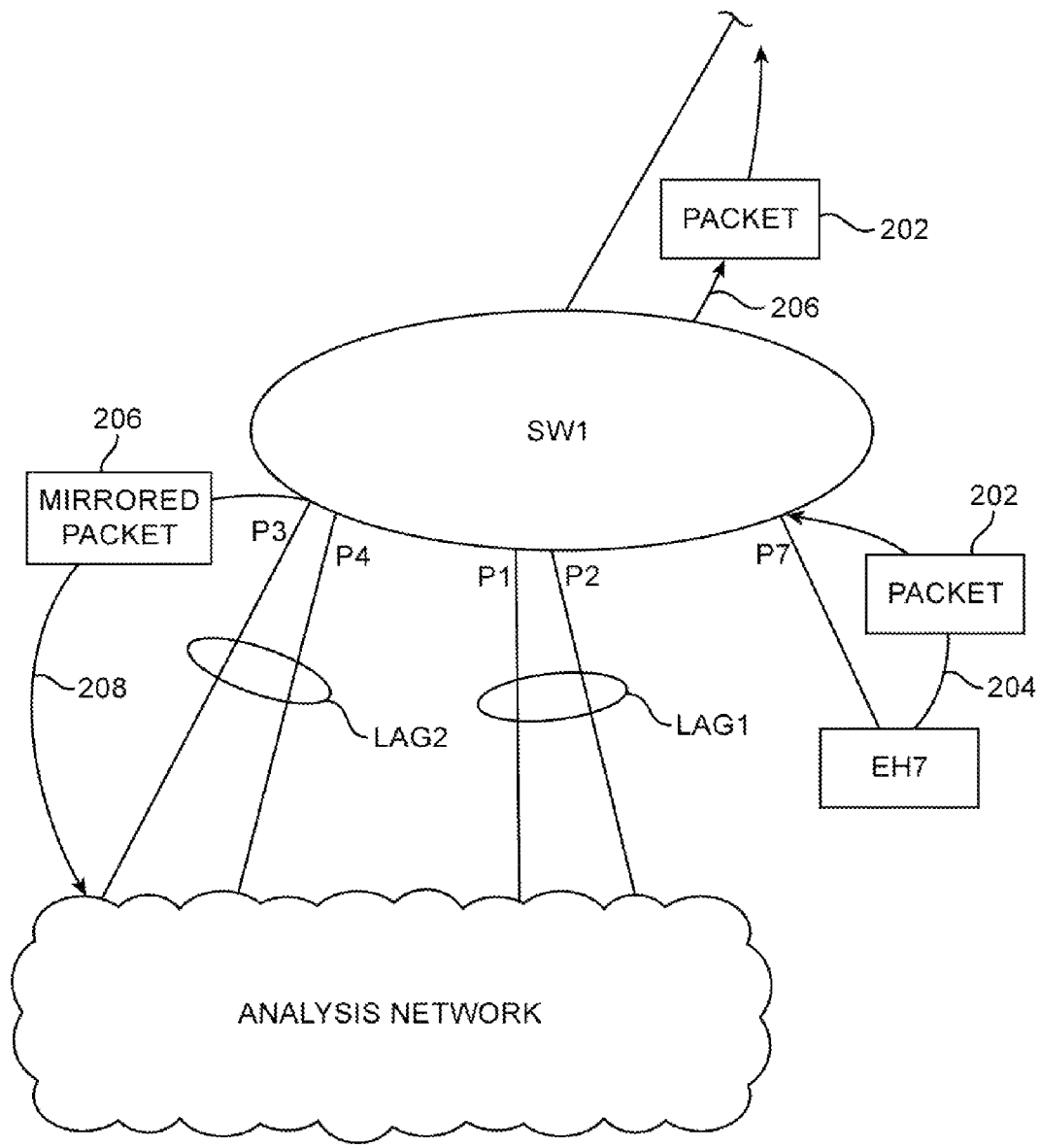
FIG. 16 is an illustrative flow diagram showing how a switch may capture network traffic to forward to a monitoring network over a corresponding group of switch ports without encapsulating the captured network traffic in accordance with an embodiment of the present invention.

FIG. 16 is an illustrative flow diagram showing how a switch having a first set of ports connected to analysis network 104 and a second set of ports connected to an end host (e.g., SW1 of FIG. 8 connected to monitoring devices 106 and end host EH7) may mirror network traffic using mirroring table entries of the type shown in FIG. 15.

As shown in FIG. 16, end host EH7 may generate a packet 202 destined for any desired end host in network 102. Packet 202 may have a source address field associated with end host EH7. At step 204, switch SW1 may receive packet 202 from end host EH7. Switch SW1 may match packet 202 to entry 200 on mirroring table 134 (e.g., because packet 202 has a source hardware address field MAC7 that matches on entry 200) and may generate copy 206 of packet 202 to forward to LAG group LAG2. For example, switch SW1 may use LAG mapping module 138 to determine that mirrored packet 206 is to be forwarded to LAG group LAG2 via one of ports P3 or P4 and may thereby route mirrored packet 206 over one of ports P3 or P4 of LAG group LAG2 (e.g., based on whichever port would optimize the traffic flow through switch SW1). In this way, a user of controller 18 need only specify a group of ports (e.g., LAG2) rather than identifying a particular optimal port to send the copied packet to for each switch (e.g., use of port groups instead of individual ports for determining flow table entries for the switches may allow for more efficient flexibility and control of the network for a network administrator of controller 18).

Switch SW1 may match packet 202 to forwarding flow table 132 to determine that packet 202 is to be forwarded elsewhere in the network (e.g., based on a destination address field of packet 202, etc.). At step 206, switch SW1 may forward packet 202 to the associated packet destination and may forward mirrored packet 206 to monitoring device 106-2 of analysis network 104 for performing network analysis operations. In this way, switch SW1 need not encapsulate or generate a network tunnel for the mirrored packet, as the mirrored packet does not traverse any other network switches in forwarding network 102 to reach the desired analysis network 104 (e.g., thereby increasing forwarding efficiency in the network with respect to scenarios in which encapsulation is used).

If desired, each switch SW in forwarding network 102 may copy egress and/or ingress versions of the received packets to monitoring network 104. For example, mirroring table 134 on switches SW may instruct the switches to copy an ingress version of a received packet (e.g., a received packet prior to providing the packet to switching fabric 136 as shown in FIG. 9) and/or may instruct the switches to copy an egress version of the received packet (e.g., a received packet after the packet has been output from switching fabric 136). The ingress and/or egress versions of the copied packet may be encapsulated and routed to the desired port group in network 102 for forwarding to monitoring network 104.

FIG. 17 is an illustrative diagram of possible mirroring table entries that may be provided by controller 18 to switches SW for copying both ingress and egress versions of a received network packet to the monitoring network. In the example of FIG. 17, controller 18 generates mirroring table entries 220 and 222 for switch SW3 to implement a monitoring session to capture traffic between end hosts EH1 and EH2. As shown in FIG. 17, controller 18 may generate first mirroring flow table entry 220 that matches on packets having destination hardware address MAC1 of end host EH1 and source hardware address MAC2 of end host EH2 and that instructs switch SW3 to copy an ingress version of packets that match on entry 220, to encapsulate the copied packets with a selected tunnel ID associated with that monitoring session, and to forward the encapsulated copied packets to LAG group LAG1. Controller 18 may generate a second mirroring flow table entry 222 that matches on packets having destination address MAC1 and source address MAC2 and that instructs switch SW3 to copy an egress version of packets that match on entry 222, to encapsulate the copied packets with the selected tunnel ID, and to forward the encapsulated copied packets to LAG group LAG1. In this way, both ingress and egress versions of the received packets may be forwarded to the monitoring network for analysis.

This example is merely illustrative. If desired, controller 18 may provide mirroring table entries to the switches that instruct the switch to only send one of ingress or egress copies of the packets to the monitoring network or that instruct the switch to send both egress and ingress copies of the packets to the monitoring network. If desired, controller 18 may instruct the switches to send both ingress and egress copies of the packets to the monitoring network by default unless instructed otherwise by a user of controller 18. If desired, ingress and egress versions of the copied packets may be encapsulated and forwarded to different tapping port groups (e.g., the ingress copy may be sent to monitoring device 106-1 via LAG1 whereas the egress copy may be sent to monitoring device 106-2 via LAG2), and/or different tunnel IDs may be used for the ingress and egress copies. In this way, monitoring network 104 may be provided with a more robust capture of network traffic in forwarding network 102 that accounts for any changes to the traffic that may occur within the switches relative to scenarios where only one of the ingress or egress version of the packets are copied.

Figure 18:
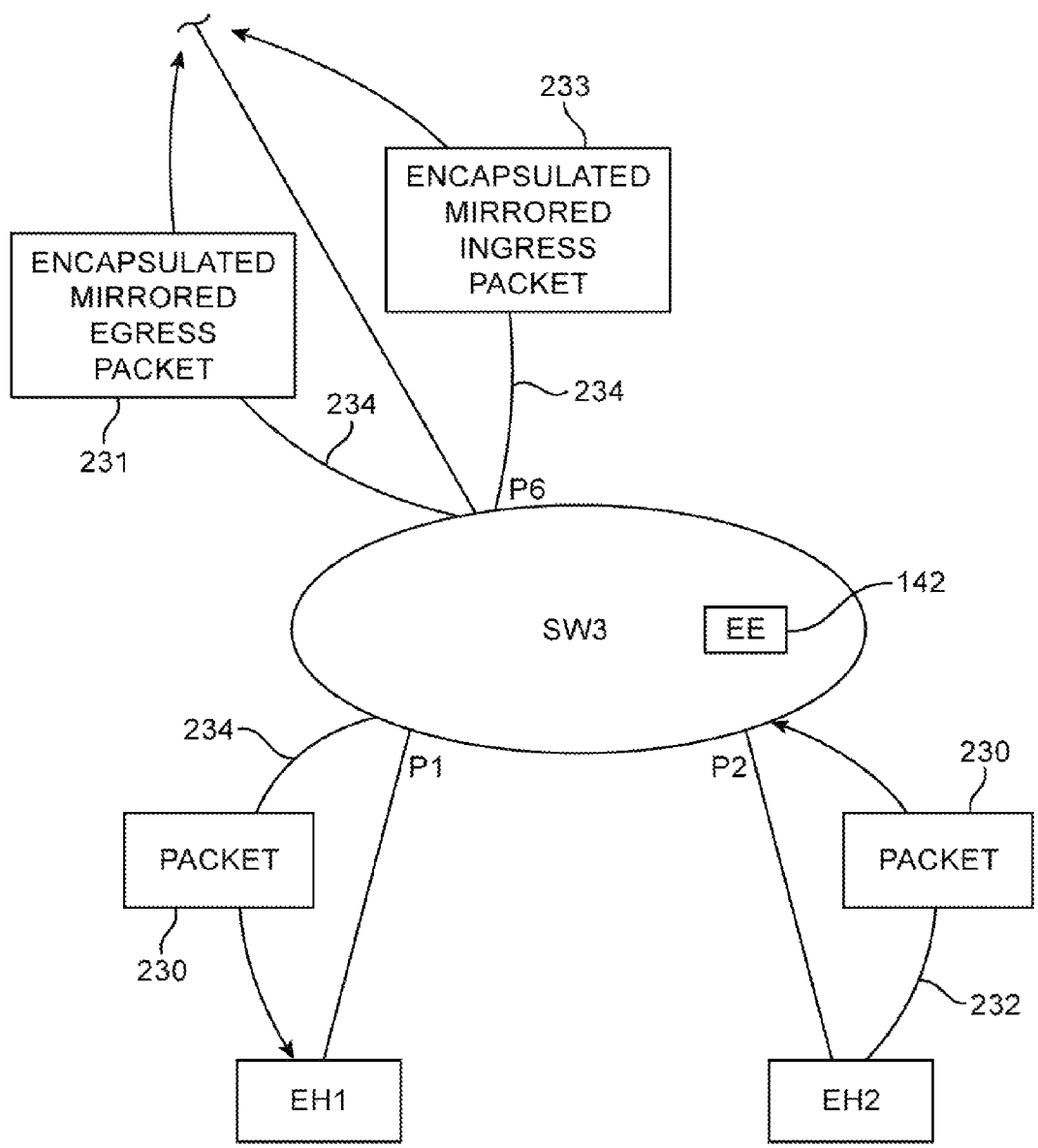
FIG. 18 is an illustrative flow diagram showing how switches in a network may be controlled to encapsulate and forward mirrored ingress and egress copies of network packets to a traffic monitoring network without disrupting normal packet forwarding in accordance with an embodiment of the present invention.

FIG. 18 is an illustrative flow diagram showing how network switch SW3 may copy ingress and egress versions of a received packet based on mirroring table entries such as mirroring table entries 220 and 222 of FIG. 17. For example, a user of controller 18 may identify a monitoring session to capture all traffic between end hosts EH1 and EH2. As shown in FIG. 18, end host EH2 may generate packet 230 and may provide packet 230 to switch SW3 at step 232.

Switch SW3 may match packet 230 to the corresponding flow table 132 and mirroring table 134 on switch SW3. Switch SW3 may route packet 230 to end host EH1 (e.g., based on entries in flow table 132) using switching fabric 136. Prior to providing packet 230 to switching fabric 136, switch SW3 may copy packet 230 and may encapsulate the copied packet using encapsulation engine 142 to generate encapsulated mirrored ingress packet 233 and may forward packet 233 to LAG group LAG1 (e.g., based on the instructions of mirroring table entry 220). After routing packet 230 using switching fabric 136, switch SW3 may copy packet 230 again and may encapsulate the copied packet using encapsulation engine 142 to generate encapsulated mirrored egress packet 231 and may forward packet 231 to LAG group LAG1 (e.g., based on the instructions of mirroring table entry 222). Mirrored packets 231 and 233 may be encapsulated using the same tunnel ID because both mirrored packets were generated for the same monitoring session.

At step 234, switch SW3 may forward encapsulated mirrored ingress packet 233 and encapsulated mirrored egress packet 231 to LAG group LAG1 on switch SW1 (e.g., via intervening switch SW2) and may forward packet 230 to destination end host EH1. In this way, both ingress and egress versions of the packets may be copied to the monitoring network for performing network monitoring operations without affecting forwarding of packet 230 from source end host EH2 to destination end host EH1.

Figure 19:
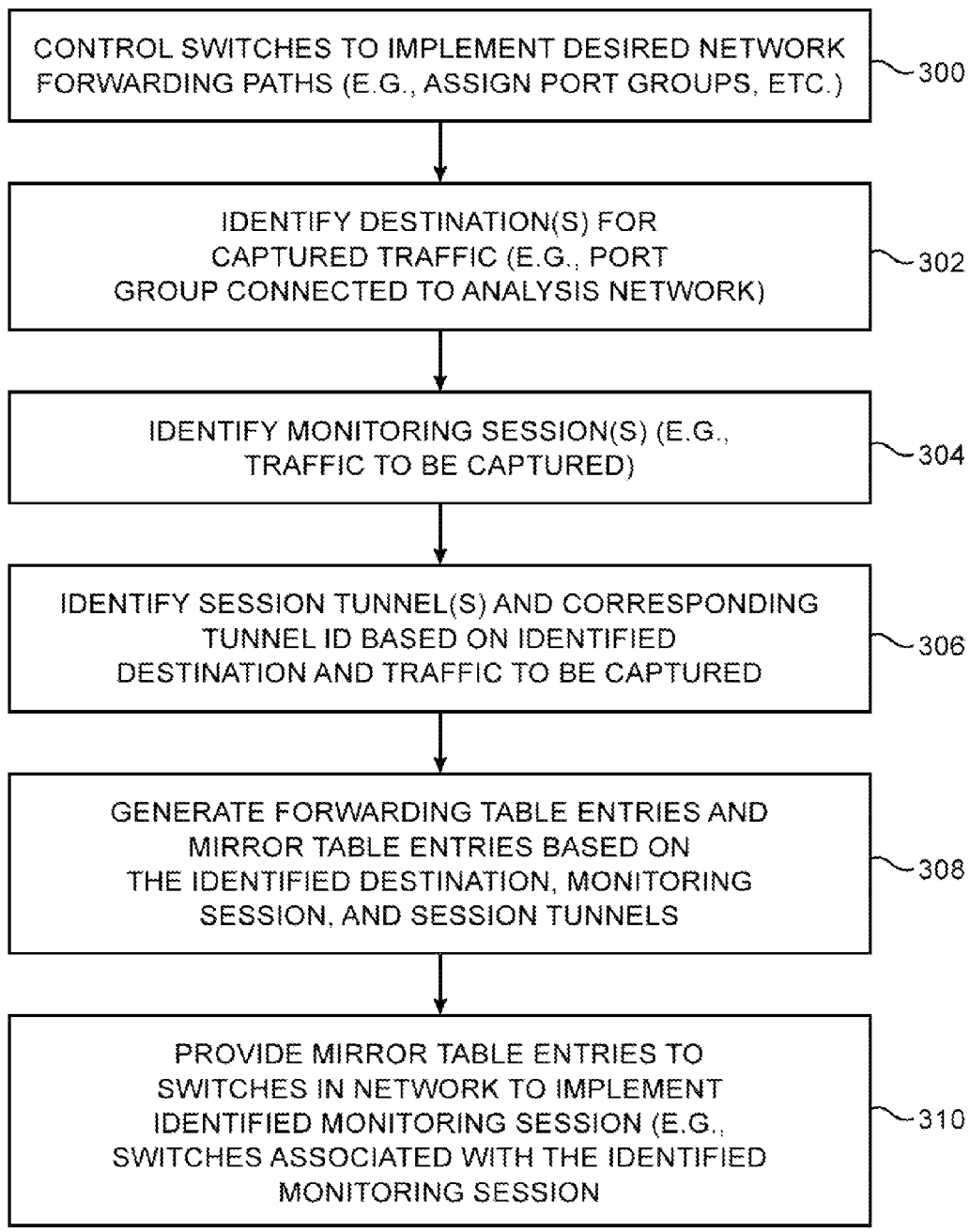
FIG. 19 is a flow chart of illustrative steps that may be performed by a controller for controlling switches in a network to forward copies of a selected subset of network traffic to a selected group of switch ports that are connected to a traffic monitoring network without disrupting normal packet forwarding in accordance with an embodiment of the present invention.

FIG. 19 is a flow chart of illustrative steps that may be performed by a controller such as controller 18 of FIG. 8 for establishing a network traffic monitoring session and copying network traffic associated with the session to monitoring network 104 for analysis without disrupting normal packet forwarding through network 102.

At step 300, controller 18 may control switches SW in forwarding network 102 to implement desired network forwarding paths. For example, controller 18 may identify network topology information associated with network 102, network policies, and/or network forwarding rules (e.g., as provided at a user input to controller 18 by a network administrator) and may generate flow table entries for forwarding tables 132 on switches SW that implement the identified network policies and forwarding rules (e.g., entries such as the entries shown in FIGS. 6A and 6B).

Controller 18 may identify (define) one or more groups of switch ports in forwarding network 102 and may assign switch port group identifiers to the identified groups of switch ports. For example, controller 18 may identify one or more LAG groups of ports such as LAG groups LAG1, LAG2, LAG3, and LAG4 as shown in FIG. 8. Controller 18 may identify the LAG groups based on a user input provided to controller 18 (e.g., by a network administrator that specifies which ports are to belong to corresponding LAG groups) or may identify the LAG groups automatically without user input (e.g., based on network topology information). Controller 18 may maintain LAG group mapping information that identifies the switch ports of each LAG group and may provide LAG group mapping information (e.g., as shown in FIG. 10) for implementation on LAG mapping modules 138 of switches SW.

At step 302, controller 18 may identify (select) one or more destinations (sinks) for monitored traffic (e.g., one or more monitoring devices or networks for capturing monitored traffic). For example, controller 18 may select an analysis network 104 and/or one or more monitoring devices 106 with which to monitor the network traffic. Controller 18 may identify one or more port groups (e.g., as defined while processing step 300) that are connected to each of the identified destinations for monitored traffic. For example, controller 18 may identify tapping LAG groups on one or more switches SW in network 102 as being connected to the identified sinks for monitored traffic. In the example of FIG. 8, controller 18 may identify that LAG group LAG1 is connected to monitoring device 106-1 in analysis network 104 and that LAG group LAG2 is connected to monitoring device 106-2 in analysis network 104. The destination for the monitored traffic may be specified by a network administrator of controller 18 (e.g., using a user input of controller 18).

At step 304, controller 18 may identify (select) a monitoring session for capturing and analyzing network traffic in forwarding network 102. The monitoring session may identify specific subsets of the network traffic on forwarding network 102 to capture and analyze. For example, the monitoring session may identify particular network packet destinations, virtual networks, physical ports, network packet sources, and/or any other network traffic attributes to use for capturing network traffic for analysis. In the example of FIGS. 11-14, controller 18 may select a monitoring session that identifies that all traffic between end hosts EH1 and EH3 in forwarding network 102 is to be captured for monitoring. In the example of FIGS. 15 and 16, controller 18 may select a monitoring session that identifies that all traffic generated by end host EH7 is to be captured for monitoring. In the example of FIGS. 17 and 18, controller 18 may select a monitoring session that identifies that both ingress and egress versions of all traffic from source end host EH2 to destination end host EH1 is to be captured for monitoring.

In general, the selected monitoring session may identify network traffic attributes of the subset of network packets to be captured as well as whether egress and/or ingress versions of the network packets are to be captured and/or how many switches are to be used for copying the subset of network packets that are to be captured. The monitoring session may be selected based on a user input provided to controller 18 by the network administrator. If desired, controller 18 may automatically include both egress and ingress versions of the captured packets in the monitoring session unless otherwise specified by the network administrator. If desired, controller 18 may identify multiple monitoring sessions for capturing traffic from many different portions of forwarding network 102 at a given time.

If desired, controller 18 may generate mirroring table entries to mirror and encapsulate matching network packets at each leaf/edge switch regardless of whether the packet is received by that switch from an end host or another leaf/edge switch in network 102. This may allow a user of controller 18 to view and analyze network traffic from each of the leaf/edge switches. However, it may be desirable for users of controller 18 to view and analyze only network packets that have been mirrored from a first hop edge switch (e.g., a switch that receives a network packet directly from an end host EH without any intervening switches). If desired, controller 18 may generate entries for mirroring tables 134 that instruct the switches to mirror and encapsulate network packets only if the input switch port over which those network packets are received is directly coupled to an end host EH (e.g., so that only network packets that reach a given leaf switch on a first hop from an end host are copied to monitoring network 104). In other words, controller 18 may control the switches in network 102 to only mirror network packets received directly from an end host EH without traversing any intervening switches by providing mirroring table entries to the switches that match only on network packets received directly from end hosts EH. If desired, a user of controller 18 may provide a user input to controller 18 to instruct controller 18 to implement such mirroring table entries, thereby allowing the user flexibility with respect to which switches mirror the desired network traffic.

Controller 18 may have knowledge of which switch ports are coupled to end hosts and which switch ports are coupled to other switches. For example, the switches may have per-port settings that control whether MAC learning is enabled or disabled at that port. If a link towards another switch (managed by the same controller 18) is detected on a port (e.g., using LLDP), that port is identified as an internal port (e.g., a port not directly coupled to an end host) and MAC learning is disabled on that port. If no switch-switch links are detected on the port, then the port is considered to be an end-host facing port and MAC learning is enabled on that port. Mirror table entries generated by controller 18 may be generated based on knowledge of which ports are end-host facing ports and may thereby match on packets received from end-host facing ports if desired (e.g., mirror table entries that match on packets received from ports having MAC learning enabled may be used to control forwarding only from switches directly coupled to end hosts).

In the example of FIG. 8, switch SW5 may have a sixth switch port P6 coupled to an additional leaf switch SW6 that is coupled to additional end hosts (not shown). Controller 18 may, upon receiving a corresponding user command, generate entries for mirroring tables 134 on the switches to instruct the switches to mirror only first hop traffic from end hosts EH having a destination address of end host EH2 (for example). Consider an example in which switch SW6 receives network packets from one of its corresponding end hosts with a destination address of end host EH2. In this scenario, switch SW6 may mirror and encapsulate the received network packets (which were received on a first hop from the corresponding end host) and may pass both the received network packets and the encapsulated mirrored packets to switch SW5. While the forwarded (un-encapsulated) network packets received at switch SW5 from switch SW6 have a destination address of end host EH2, the received network packets are not received on a first hop from an end host (because switch SW5 does not have an input port that is directly coupled to the end host that generated the network packets) and will therefore not match on the generated mirror table entries. In other words, switch SW5 may forward the network packets received from switch SW6 to switch SW4 without mirroring the network packets. In this way, a user of controller 18 may monitor traffic only mirrored on a first hop from end hosts in network 102. This example is merely illustrative and does not serve to limit the present invention.

At step 306, controller 18 may identify network tunnels for the identified monitoring sessions between the switches and the identified monitored traffic destination(s). For example, controller 18 may identify a set of network tunnels between for each identified monitoring session and may identify corresponding tunnel IDs (e.g., VLAN identifiers) to be used for each monitoring session. In this way, a first subset of traffic to be captured (associated with a first monitoring session) may be assigned a first tunnel ID for encapsulating and tunneling the captured traffic to a corresponding destination whereas a second subset of traffic to be captured (associated with a second monitoring session) may be assigned a second tunnel ID that is different from the first tunnel ID for encapsulating and tunneling the captured traffic to a corresponding destination.

At step 308, controller 18 may generate forwarding table entries for forwarding table 132 on switches SW and may generate mirroring table entries for mirroring table 134 on switches SW based on the selected destinations for the captured traffic, the selected monitoring sessions, and the identified network tunnels. For example, controller 18 may generate mirroring table entries as shown in FIG. 11 so that traffic between end hosts EH1 and EH3 is captured and copied to port group LAG1 connected to destination monitoring device 106-1 and so that the copied traffic is encapsulated using a corresponding tunnel ID ID1. Similarly, controller 18 may generate forwarding table entries as shown in FIG. 12 so that the mirrored and encapsulated traffic that has been provided with tunnel ID ID1 is forwarded to LAG group LAG1 (e.g., forwarding table entries for the intervening switches on the network). Controller 18 may generate mirroring table entries and forwarding table entries to implement the identified network tunnels to the identified monitoring destinations for each identified monitoring session. In this way, multiple monitoring sessions may be established and maintained at any given time using controller 18.

At step 310, controller 18 may provide the generated mirror table entries and forwarding table entries to the switches SW in network 102 to implement the desired monitoring session(s) and the corresponding network tunnels. Controller 18 may provide different monitoring table entries and forwarding table entries to each switch in network 102 (e.g., based on whether each switch is a part of a corresponding monitoring session) or may provide the same entries to all switches in network 102. In this way, any desired subsets of the network traffic in forwarding network 102 may be copied and monitored in a robust and efficient manner at any desired points in the network without interrupting normal packet forwarding operations. By identifying port groups connected to the monitoring network and instructing the switches to forward copies of the packets to the identified port groups, the network may more efficiently monitor network traffic on a large scale and may more effectively handle port failover scenarios (e.g., in scenarios in which one or more ports of a given port group fail, traffic may still be routed to the monitoring network through other ports of the port group) relative to examples in which port groups are not identified. Such an arrangement may allow a user or network administrator to identify monitoring operations to perform without needing to physically tap into desired portions of the network to monitor.

The foregoing is merely illustrative of the principles of this invention and various modifications can be made by those skilled in the art without departing from the scope and spirit of the invention.

What is claimed is:

1. A method of using a controller that controls switches in a forwarding network, wherein the forwarding network performs packet forwarding operations to forward network packets between end hosts that are coupled to the forwarding network, the method comprising:
   with the controller, identifying a group of switch ports on at least one of the switches in the forwarding network that is connected to a network traffic analysis network;
   with the controller, controlling a selected switch of the forwarding network to copy at least a portion of the network packets that are forwarded between the end hosts of the forwarding network to the identified group of switch ports without interfering with the packet forwarding operations of the forwarding network; and
   with the controller, controlling an additional selected switch of the forwarding network to copy the portion of the network packets that are forwarded between the end hosts of the forwarding network to the identified group of switch ports without interfering with the packet forwarding operations of the forwarding network.

2. The method defined in claim 1, further comprising:
   with the controller, configuring the at least one of the switches to form a link aggregation group from the switch ports of the identified group of switch ports.

3. The method defined in claim 2, wherein configuring the at least one of the switches to form the link aggregation group comprises:
   providing link aggregation mapping information to the at least one of the switches.

4. The method defined in claim 1, further comprising:
   with the controller, controlling the switches in the forwarding network to establish a first network tunnel between the selected switch and the at least one of the switches in the forwarding network.

5. The method defined in claim 4, further comprising:
   with the controller, controlling the switches in the forwarding network to establish a second network tunnel between the additional selected switch and the at least one of the switches.

6. The method defined in claim 5, further comprising:
   with the controller, controlling the selected switch to establish the first network tunnel by encapsulating a first copied version of the portion of the network packets using a selected tunnel identifier; and
   with the controller, controlling the additional selected switch to establish the second network tunnel by encapsulating a second copied version of the portion of the network packets using the selected tunnel identifier.

7. The method defined in claim 6, wherein the selected tunnel identifier comprises a Virtual Local Area Network (VLAN) identifier.

8. The method defined in claim 1, further comprising:
   with the controller, providing at least one mirroring flow table entry to the selected switch, wherein the at least one mirroring flow table entry comprises a matching field that matches on the portion of the network packets and an action field that instructs the selected switch to generate mirrored network packets by copying the portion of the network packets and that instructs the selected switch to forward the generated mirrored network packets to the identified group of switch ports.

9. The method defined in claim 8, further comprising:
   with the controller, providing at least one forwarding flow table entry to an intervening switch located between the selected switch and the at least one switch in the network, wherein the at least one forwarding flow table entry has a matching field that matches on the mirrored network packets generated by the selected switch and an action field that instructs the intervening switch to forward the mirrored network packets generated by the selected switch to the identified group of switch ports.

10. The method defined in claim 8, wherein the mirroring flow table entry instructs the selected switch to generate mirrored ingress network packets by copying an ingress version of the portion of the network packets and instructs the selected switch to generate mirrored egress network packets by copying an egress version of the portion of the network packets, and wherein the at least one mirroring flow table entry instructs the selected switch to forward the generated mirrored egress network packets and the generated mirrored ingress network packets to the identified group of switch ports.

11. A method of using a controller that controls switches in a network having end hosts that are coupled to the switches, the method comprising:
    with the controller, controlling the switches in the network to implement network forwarding paths for forwarding network packets between the end hosts;
    with the controller, configuring the switches in the network to form a plurality of switch port groups;
    with the controller, identifying a switch port group of the plurality of switch port groups that is connected to a network traffic monitoring system;
    with the controller, selecting a subset of the network packets that are forwarded between the end hosts on which to perform network traffic monitoring operations using the network traffic monitoring system;
    with the controller, controlling at least one of the switches in the network to generate mirrored network packets by copying the selected subset of the network packets;
    with the controller, controlling the at least one switch to forward the mirrored network packets to the identified switch port group;
    with the controller, identifying a network tunnel between the at least one switch and the identified switch port group;
    with the controller, instructing the at least one switch to encapsulate the mirrored network packets using a tunnel identifier associated with the network tunnel; and
    with the controller, instructing a de-encapsulation engine to de-encapsulate the mirrored network packets before the mirrored network packets are received at the identified switch port group.

12. The method defined in claim 11, wherein selecting the subset of the network packets on which to perform the network monitoring operations comprises:
    identifying at least one of a source network address and a destination network address of the network packets that are forwarded between the end hosts on which to perform the network traffic monitoring operations.

13. The method defined in claim 11, further comprising:
    with the controller, identifying an additional switch port group of the plurality of switch port groups that is connected to an additional network traffic monitoring system;
    with the controller, selecting an additional subset of the network packets that are forwarded between the end hosts on which to perform the network traffic monitoring operations;
    with the controller, controlling at least one additional switch in the network to generate additional mirrored network packets by copying the selected additional subset of the network packets; and
    with the controller, controlling the at least one additional switch to forward the additional mirrored network packets to the identified additional switch port group.

14. The method defined in claim 13, wherein the switch port group and the additional switch port group both comprise physical ports of a given switch in the network.

15. The method defined in claim 11, further comprising:
    with the controller, controlling the at least one switch to implement the network forwarding paths by providing flow table entries for a forwarding table on the at least one switch; and
    with the controller, controlling the at least one switch to generate and forward the mirrored network packets by providing flow table entries for a mirroring table that is separate from the forwarding table on the at least one switch.

16. The method defined in claim 11, further comprising:
    with the controller, providing flow table entries for forwarding tables on additional switches in the network that instruct the additional switches to forward matching network packets that have the tunnel identifier to the identified switch port group.

17. A method of operating a controller that controls switches in a network having end hosts that are coupled to ports of the switches, the method comprising:
    with the controller, configuring a first switch in the network to form a link aggregation group from a set of ports of the first switch, wherein the link aggregation group is connected to a packet monitoring network;
    with the controller, controlling a second switch in the network to capture a set of network packets forwarded between the end hosts by copying the set of network packets and forwarding the copied set of network packets to the link aggregation group without interfering with forwarding of the set of network packets between the end hosts; and
    with the controller, controlling the first switch to selectively de-encapsulate network packets received at the first switch.

18. The method defined in claim 17, further comprising:
    with the controller, controlling a third switch in the network to capture an additional set of network packets forwarded between the end hosts by copying the additional set of network packets and forwarding the copied additional set of network packets to the link aggregation group without interfering with forwarding of the additional set of network packets between the end hosts.

19. The method defined in claim 17, further comprising:
    with the controller, controlling the second switch in the network to capture an additional set of network packets forwarded between the end hosts by copying the additional set of network packets and forwarding the copied additional set of network packets to the link aggregation group without interfering with forwarding of the additional set of network packets between the end hosts.

20. The method defined in claim 17, further comprising:
    with the controller, controlling a third switch in the network to capture the set of network packets by copying the set of network packets and forwarding the set of network packets copied at the third switch to the link aggregation group without interfering with forwarding of the set of network packets between the end hosts.

21. The method defined in claim 17, further comprising:
    with the controller, configuring at least one of a first switch and a third switch in the network to form an additional link aggregation group from an additional set of ports, wherein the link aggregation group is connected to one of the packet monitoring network and an additional packet monitoring network; and
    with the controller, controlling at least one of the second switch and a fourth switch in the network to capture an additional set of network packets forwarded between the end hosts by copying the additional set of network packets and forwarding the copied additional set of network packets to the additional link aggregation group without interfering with forwarding of the additional set of network packets between the end hosts.

22. The method defined in claim 17, wherein controlling the second switch in the network to capture the set of network packets comprises:
   identifying a set of network packet attributes associated with the set of network packets; and
   generating a flow table entry for a mirroring table on the second switch, the flow table entry having a matching field that matches on the set of network packet attributes and an action field that instructs the second switch to copy the set of network packets and that instructs the second switch to forward the copied set of network packets to the link aggregation group.

23. The method defined in claim 22, wherein the flow table entry instructs the second switch to copy ingress versions of the set of network packets and to forward the copied ingress versions of the set of network packets to the link aggregation group, wherein the flow table entry instructs the second switch to copy egress versions of the set of network packets and to forward the copied egress versions of the set of network packets to the link aggregation group, and wherein, in response to a user input received at the controller, the flow table entry instructs the second switch to copy and forward only one of the ingress and egress versions of the set of network packets.

24. The method defined in claim 22, wherein the flow table entry instructs the second switch to copy the set of network packets only if the set of network packets is received over a switch port of the second switch that is coupled directly to an end host over a network path that is free from any other switches.

* * * * *